(12) United States Patent
Han et al.

(10) Patent No.: US 12,388,717 B2
(45) Date of Patent: Aug. 12, 2025

(54) METHOD AND DEVICE FOR SELECTING SERVICE IN WIRELESS COMMUNICATION SYSTEM

(71) Applicant: Samsung Electronics Co., Ltd., Suwon-si (KR)

(72) Inventors: Yoonseon Han, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 17/904,938

(22) PCT Filed: Feb. 18, 2021

(86) PCT No.: PCT/KR2021/002070
§ 371 (c)(1),
(2) Date: Aug. 24, 2022

(87) PCT Pub. No.: WO2021/172810
PCT Pub. Date: Sep. 2, 2021

(65) Prior Publication Data
US 2023/0090022 A1    Mar. 23, 2023

(30) Foreign Application Priority Data
Feb. 26, 2020    (KR) .......................... 10-2020-0023832

(51) Int. Cl.
*H04L 41/14*    (2022.01)
*H04L 41/16*    (2022.01)
(Continued)

(52) U.S. Cl.
CPC ............ *H04L 41/145* (2013.01); *H04L 41/16* (2013.01); *H04L 41/34* (2022.05); *H04L 41/5058* (2013.01); *H04L 43/06* (2013.01)

(58) Field of Classification Search
CPC . H04L 41/5058; H04L 43/06; H04L 41/5032; H04L 41/34; H04L 41/145; H04L 41/16; H04L 43/12
See application file for complete search history.

(56) References Cited

U.S. PATENT DOCUMENTS 10,911,326 B2    2/2021  Han et al.
11,051,192 B2 *  6/2021  Li ........................... H04L 41/14
(Continued)

FOREIGN PATENT DOCUMENTS

CN    110324170 A  * 10/2019  ............... G06F 8/61
CN    110569288 A    12/2019
(Continued)

OTHER PUBLICATIONS

3GPP, "3rd Generation Partnership Project; Technical Specification Group Services and System Aspects; Non-Access-Stratum (NAS) protocol for 5G System (5GS); Stage 3 (Release 16)", 3GPP, 2019, 3GPP TS 23.501 V16.1.0 (Jun. 2019) (Year: 2019).*

(Continued)

*Primary Examiner* — Nicholas R Taylor
*Assistant Examiner* — Angela Widhalm De Rodriguez

(57) ABSTRACT

For selecting a service in a wireless communication system, a network data analytics function (NWDAF) receives, from a network function (NF), a request message for analytics information. Based on the request message, the NWDAF transmits, to a network repository function (NRF), a discovery message for discovering at least another NWDAF. A response message relating to the discovery message is received by the NWDAF from the NRF, where the response message includes information about the at least another NWDAF. Based on the information, a request message for processing the analytics information is transmitted by the NWDAF to the other NWDAF.

4 Claims, 15 Drawing Sheets

(51) Int. Cl.
    *H04L 41/34*     (2022.01)
    *H04L 41/50*     (2022.01)
    *H04L 43/06*     (2022.01)

(56) References Cited

U.S. PATENT DOCUMENTS

| | | | |
|---|---|---|---|
| 11,283,687 | B2 | 3/2022 | Wang et al. |
| 11,716,399 | B2 | 8/2023 | Zhang |
| 11,929,884 | B2 * | 3/2024 | Hong ............... H04L 43/06 |
| 2014/0280338 | A1 * | 9/2014 | Metz ............... H04L 41/0853 |
| | | | 707/774 |
| 2018/0262924 | A1 | 9/2018 | Dao et al. |
| 2020/0228420 | A1 * | 7/2020 | Dao ............... H04L 41/142 |
| 2020/0401945 | A1 * | 12/2020 | Xu ............... H04L 41/16 |
| 2022/0294606 | A1 * | 9/2022 | Norrman ............... G06N 20/00 |
| 2022/0329493 | A1 | 10/2022 | Hong et al. |
| 2023/0254719 | A1 * | 8/2023 | Kim ............... G06N 20/00 |
| | | | 370/252 |

FOREIGN PATENT DOCUMENTS

| | | | | |
|---|---|---|---|---|
| CN | 110677299 A | * | 1/2020 | ............ H04L 41/024 |
| CN | 110798360 A | | 2/2020 | |
| EP | 3989485 A1 | | 4/2022 | |
| EP | 4020252 A1 | | 6/2022 | |
| KR | 10-2019-0096947 A | | 8/2019 | |
| KR | 10-2019-0132898 A | | 11/2019 | |
| WO | 2019158737 A1 | | 8/2019 | |
| WO | 2019158777 A1 | | 8/2019 | |
| WO | WO-2020200487 A1 | * | 10/2020 | ............ G06N 20/00 |
| WO | WO-2021023388 A1 | * | 2/2021 | ............ H04L 41/145 |
| WO | WO-2021136601 A1 | * | 7/2021 | ............ H04L 41/12 |

OTHER PUBLICATIONS

3GPP, "3rd Generation Partnership Project; Technical Specification Group Services and System Aspects; System Architecture for the 5G System; Stage 2 (Release 16)", 3GPP, 2019, 3GPP TS 23.501 V16.1.0 (Jun. 2019) (Year: 2019).*
3GPP, "3rd Generation Partnership Project; Technical Specification Group Services and System Aspects; Procedures for the 5G System; Stage 2 (Release 16)", 3GPP, 2019, 3GPP TS 23.502 V16.1.0 (Jun. 2019) (Year: 2019).*
International Search Report and Written Opinion of the International Searching Authority dated Jun. 8, 2021, in connection with International Application No. PCT/KR2021/002070, 13 pages.
ZTE, "[draft] Reply LS on RAN related parameters collected from UE," R3-190277, 3GPP TSG RAN WG3 NR#103, Athens, Greece, Feb. 25-Mar. 1, 2019, 6 pages.
Supplementary European Search Report dated Jun. 23, 2023, in connection with European Application No. 21759594.1, 11 pages.
3GPP TR 23.700-91 V0.3.0 (Jan. 2020), Technical Report, 3rd Generation Partnership Project; Technical Specification Group Services and System Aspects; Study on enablers for network automation for the 5G System (5GS); Phase 2 (Release 17), Jan. 2020, 35 pages.
3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019, 417 pages.
Huawei, et al., "Solution to multiple NWDAF instances", S2-2001210 (merge of S2-2000854, 2000167), SA WG2 Meeting #136H, Incheon, Korea, Jan. 13-17, 2020, 7 pages.
Office Action dated May 20, 2025, in connection with Korean Application No. 10-2020-0023832, 9 pages.
Niknam, S., et al., "Federated Learning for Wireless Communications: Motivation, Opportunities and Challenges", arXiv: 1908.06847v1 [eess.SP], Jul. 2019, 6 pages.

* cited by examiner

METHOD AND DEVICE FOR SELECTING SERVICE IN WIRELESS COMMUNICATION SYSTEM

CROSS-REFERENCE TO RELATED APPLICATIONS

This application is a 371 National Stage of International Application No. PCT/KR2021/002070, filed Feb. 18, 2021, which claims priority to Korean Patent Application No. 10 2020 0023832, filed Feb. 26, 2020, the disclosures of which are herein incorporated by reference in their entirety.

BACKGROUND

1. Field

The disclosure relates to methods and apparatuses for selecting a service in a wireless communication system.

2. Description of Related Art

To meet demand due to ever-increasing wireless data traffic after commercialization of the 4th generation (4G) communication system, there have been efforts to develop an advanced 5th generation (5G) system or pre-5G communication system. For this reason, the 5G or pre-5G communication system is also called a beyond 4G network communication system or post long term evolution (LTE) system.

Implementation of the 5G communication system using ultra-frequency millimeter wave (mmWave) bands, e.g., 60 GHz bands, is considered to achieve higher data rates. To reduce pathloss of radio waves and to increase a transmission range of radio waves in the ultra-frequency bands, beamforming, massive multiple-input multiple-output (MIMO), full dimensional MIMO (FD-MIMO), array antenna, analog beamforming, and large-scale antenna techniques are under discussion and applied to the NR system.

Also, to improve a network of the system, techniques, such as an advanced small cell, a cloud radio access network (cloud RAN), a ultra-dense network, device-to-device (D2D) communication, wireless backhaul, a moving network, cooperative communication, coordinated multi-points (CoMP), and received-interference cancellation, have been developed in the 5G communication system.

In addition, advanced coding modulation (ACM) schemes, namely, hybrid FSK and QAM modulation (FQAM) and sliding window superposition coding (SWSC), and advanced access techniques, namely, a filter bank multi-carrier (FBMC), a non-orthogonal multiple access (NOMA), and a sparse coding multiple access (SCMA), have been developed, in the 5G communication system.

In the meantime, the Internet is evolving from a human-centered connectivity network where humans generate and consume information to an Internet of Things (IoT) network where distributed entities or things send, receive and process information. Internet of everything (IoE) technologies in which big data processing technologies, etc. based on connection with a cloud server, etc. are combined with the IoT technologies have also emerged. To implement the IoT, technological elements, such as a sensing technology, a wired/wireless communication and network infrastructure, a service interface technology, and a security technology, are required, and thus, recently, techniques for connection between things, such as a sensor network, machine-to-machine (M2M) communication, machine-type communication (MTC), etc., have been studied. In an IoT environment, intelligent Internet technology (IT) services that create new values in human life by collecting and analyzing data generated among connected things, may be provided. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

Thus, various attempts have been made to apply the 5G communication system to an IoT network. For example, 5G communication such as sensor networks, M2M communication, and MTC are being implemented by using various schemes such as beamforming, MIMO, and array antennas. As described above, that the cloud RAN may be applied as the big data processing technology may also be regarded as an example of the convergence between the 5G technology and the IoT technology.

While the distribution of the 5G mobile communication is started, various wireless connection techniques, such as 3rd generation (3G) or 4G (LTE) communication networks previously used, also exist together, and an available frequency band has expanded due to introduction of high frequencies. Also, it is expected that a greater number of base stations are to be established, compared to the previous case, in order to satisfy high communication requirements. In this situation, in order to reduce costs or power for network management or to minimize interference, a method of efficiently managing wireless resources and devices is required.

SUMMARY

Based on the discussion described above, the disclosure provides methods and apparatuses for selecting a service in a wireless communication system.

Described embodiments provide methods and apparatuses for effectively selecting a service in a wireless communication system.

DETAILED DESCRIPTION

Figure 1:
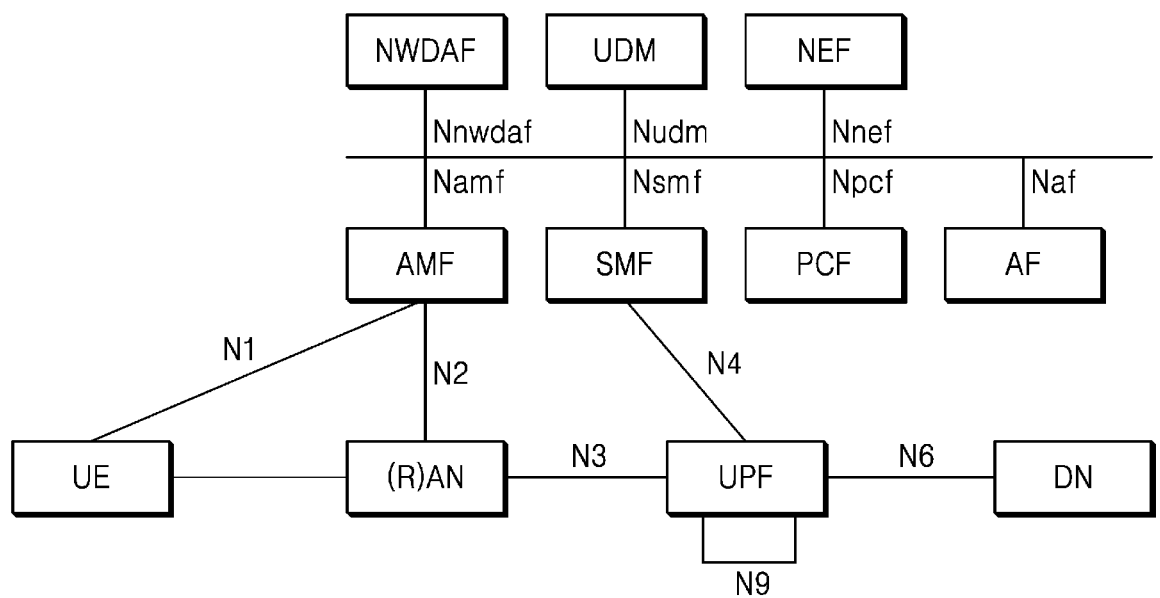
FIG. 1 illustrates a structure of a mobile communication system and entities outside a network, according to an embodiment of the disclosure.

According to an embodiment of the disclosure, an operating method of a network data analytics function (NWDAF) in a wireless communication system includes: receiving, from a network function (NF), a request message for analytics information; based on the received request message, transmitting, to a network repository function (NRF), a discovery message for discovering another NWDAF; receiving, from the NRF, a response message with respect to the discovery message; based on information about the other NWDAF, the information being included in the received response message, transmitting, to the other NWDAF, a request message for processing the analytics information; receiving, from the other NWDAF, a response message with respect to the request message for processing the analytics information; and based on a result of processing, performed by the NWDAF, of the analytics information, and a result of processing, performed by the other NWDAF, of the analytics information, the result being included in the response message received from the other NWDAF, generating the analytics information.

According to an embodiment of the disclosure, a network data analytics function (NWDAF) in a wireless communication system includes: a transceiver; and at least one processor configured to: control the transceiver to: receive, from a network function (NF), a request message for analytics information; based on the received request message, transmit, to a network repository function (NRF), a discovery message for discovering another NWDAF; receive, from the NRF, a response message with respect to the discovery message; based on information about the other NWDAF, the information being included in the received response message, transmit, to the other NWDAF, a request message for processing the analytics information; and receive, from the other NWDAF, a response message with respect to the request message for processing the analytics information; and, based on a result of processing, performed by the NWDAF, of the analytics information, and a result of processing, performed by the other NWDAF, of the analytics information, the result being included in the response message received from the other NWDAF, generate the analytics information.

According to an embodiment of the disclosure, an operating method of a network data analytics function (NWDAF) in a wireless communication system includes: receiving, from a network function (NF), a request message for analytics information; based on the request message for the analytics information, transmitting, to a network repository function (NRF), a discovery message for discovering at least another NWDAF; receiving, from the NRF, a response message with respect to the discovery message, wherein the response message with respect to the discovery message includes information about the at least another NWDAF; based on the information about the at least another NWDAF, transmitting, to the at least another NWDAF, a request message for processing the analytics information; receiving, from the at least another NWDAF, a response message with respect to a request message for processing the analytics information, wherein the response message with respect to the request message for processing the analytics information includes a result of processing, performed by the at least another NWDAF, of the analytics information; based on a result of processing, performed by the NWDAF, of the analytics information, and the result of processing, performed by the at least another NWDAF, of the analytics information, generating the analytics information requested by the NF; and transmitting, to the NF, the generated analytics information.

According to an embodiment of the disclosure, a network data analytics function (NWDAF) in a wireless communication system includes: a transceiver; and at least one processor configured to: receive, from a network function (NF), a request message for analytics information, through the transceiver; based on the request message for the analytics information, transmit, to a network repository function (NRF), a discovery message for discovering at least another NWDAF, through the transceiver; receive, from the NRF, a response message with respect to the discovery message, through the transceiver, wherein the response message with respect to the discovery message includes information about the at least another NWDAF; based on the information about the at least another NWDAF, transmit, to the at least another NWDAF, a request message for processing the analytics information, through the transceiver; receive, from the at least another NWDAF, a response message with respect to a request message for processing the analytics information, through the transceiver, wherein the response message with respect to the request message for processing the analytics information includes a result of processing, performed by the at least another NWDAF, of the analytics information; based on a result of processing, performed by the NWDAF, of the analytics information, and the result of processing, performed by the at least another NWDAF, of the analytics information, generate the analytics information requested by the NF; and transmit, to the NF, the generated analytics information, through the transceiver.

Hereinafter, embodiments of the disclosure will be described in detail with reference to the accompanying drawings. In describing the disclosure, when the detailed description of the relevant known functions or configurations is determined to unnecessarily obscure the gist of the disclosure, the detailed description thereof may be omitted.

The terms as used herein are those defined by taking into account functions in the disclosure, but the terms may vary depending on the intention of users or one of ordinary skill in the art, precedents, or the like. Therefore, the definitions should be made based on the contents throughout the specification.

Advantages and features of one or more embodiments of the disclosure and methods of accomplishing the same may be understood more readily by reference to the following detailed description of the embodiments of the disclosure and the accompanying drawings. However, the disclosure is not limited to the embodiments described below, but may be implemented in various different forms, the embodiments are solely provided to make the disclosure complete and to inform a person of skill in the art to which the disclosure pertains of the full scope of the disclosure, and the disclosure is only defined by the scope of the claims. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment, so it is possible to manufacture a product that contains instructions for performing functions described in the block(s) of the flowchart. The computer program instructions may also be loaded on computers or other programmable data processing equipment, so it is possible for the instructions to generate a process executed on the computer or the other programmable data processing equipment to provide steps for performing functions described in the block(s) of the flowchart.

Furthermore, each block may represent a module, segment, or a part of code including one or more executable instructions to perform particular logic function(s). It should also be noted that the functions described in the blocks may occur out of order in alternate embodiments of the disclosure. For example, two blocks illustrated in succession may in fact be executed substantially concurrently, or the blocks may sometimes be executed in a reverse order, depending on the functions involved therein.

Here, the term "unit" used in the embodiments of the disclosure denotes a software component or a hardware component such as a field programmable gate array (FPGA) or an application specific integrated circuit (ASIC), and a "unit" performs predetermined functions. However, the "unit" is not limited to the software or hardware. The "unit" may be configured to be stored in an addressable storage medium, or to operate one or more processors. For example, the "unit" may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and "units" may be combined into a less number of components and the "units" or further divided into a more number of components and "units." Moreover, the components and the "units" may be implemented to execute one or more central processing units (CPUs) in a device or security multimedia card. In embodiments of the disclosure, the "unit" may include one or more processors.

In describing the disclosure, when the detailed description of the relevant known functions or configurations is determined to unnecessarily obscure the gist of the disclosure, the detailed description thereof may be omitted. Hereinafter, embodiments of the disclosure are described by referring to the accompanying drawings.

In the following description, terms for identifying access nodes, terms referring to network entities, terms referring to messages, terms referring to interfaces between network entities, terms referring to various identification information, and the like are used for convenience of description. Therefore, the disclosure is not limited to the terms to be described later, and other terms referring to entities having an equivalent technical meaning may be used.

For convenience of descriptions, in the disclosure, terms and names defined in the 3rd Generation Partnership Project Long Term Evolution (3GPP LTE) standard are used therein. However, the disclosure is not limited by the terms and names and may be equally applied to systems conforming to other standards. In particular, the disclosure may be applied to a 3GPP New Radio (NR, 5th generation (5G) mobile communication standards). The term "eNB" as used in the disclosure may be used interchangeably with the term "gNB" for convenience of description. That is, a base station described as the eNB may represent the gNB. Also, the term "terminals (user equipments (UEs))" may refer to not only mobile phones, NB-Internet of things (IoT) devices, and sensors but also other wireless communication devices.

Hereinafter, the term "base station" refers to an entity for allocating resources to a UE and may be used interchangeably with at least one of a gNode B, an eNode B, a node B, a base station (BS), a radio access unit, a base station controller, or a node over a network. Examples of a terminal may include a UE, a mobile station (MS), a cellular phone, a smartphone, a computer, and a multimedia system capable of performing a communication function. However, the disclosure is not limited to the examples.

In addition, in the detailed description of the embodiments of the disclosure, a new radio access network (RAN), and a packet core (5G System, or 5G Core Network, or Next Generation (NG) Core) of the 5G mobile communication standards specified by 3GPP, a specification standardization organization, are mainly described. However, the gist of the disclosure may also apply to other communication systems with similar technical backgrounds through slight modification without departing from the scope of the disclosure, which can be implemented based on the judgment of one of ordinary skill in the art of the disclosure.

The disclosure provides a method of selecting a network data analytics function (NWDAF) instance, by taking into account an analytic purpose and a network situation in a mobile communication network.

The disclosure relates to a method of discovering an NWDAF, which is a network function for providing analytics information, according to a purpose and a situation, and controlling the discovered NWDAF to be used, for using network analytics information in a mobile communication system. The network analytics information may be used for an NWDAF or an entity corresponding to the NWDAF in a core network to collect information from devices inside or outside the network, perform an analysis, and transmit a result thereof. The described network analytics information may include analytics information associated with a UE, wired or wireless network situation information, and analytics information associated with a service used by each UE, and may include prediction information related to a future time point together with statistical analytics information of the past and present situations.

In an environment for using the network analytics information described above, the network analytics information may be generated by using various types of algorithms. For example, depending on a purpose of using the analytics information, an application situation, or an application target, methods of generating the optimal analytics information may vary. Also, depending on the performance and a load situation of the NWDAF generating the analytics information, a method of selecting an NWDAF instance providing the analytics information may be required. To this end, with respect to a method of generating analytics information selected according to a purpose, provided is a method of selecting an optimal NWDAF instance for providing network analytics information for an appropriate time point or situation. In this disclosure, network analytics information may be interchangeably used with analytics information. That is, hereinafter, the analytics information may denote the network analytics information.

Various embodiments of the disclosure may use an NWDAF providing network analytics information in a mobile communication system. The disclosure includes a method of selecting an optimal NWDAF instance by considering a purpose of use of the analytics information and a network situation, when there are NWDAF instances providing the analytics information and having different performance levels and specific functions. In detail, a selected optimal algorithm for generating analytics information may be changed according to a purpose of use of the network analytics information. In addition, the disclosure includes a method, according to which an optimal NWDAF instance is selected in a specific situation according to a network situation and a resource situation, by comprehensively taking into account information about geographical locations, delay levels, specifications, and loads of NWDAF instances.

The number of UEs using mobile communication networks and the number of services and applications for supporting the same have exponentially increased. Also, for improvement of the quality of mobile communication networks, designs and operations of wireless networks and core networks have become ever sophisticated. In this situation, in addition to UEs simply using voice call and data services, new types of UEs, such as a factory, an unmanned aerial vehicle, a robot, an automobile, an airplane, etc., have emerged. These new types of UEs are expected to continually increase in number, and in order to effectively support their purposes, evolution of services of mobile communication networks are also expected.

While the purposes and types of various UEs are changing, in the case of the mobile communication networks, radio resources are shared by all UEs, and generally, core networks are also operated to be shared by all UEs. However, each UE has a different type and purpose, and thus, may have a different operating format and service application. Therefore, there may be a difference in interaction with a network between the UEs. Therefore, in order to effectively support each type of UE, the mobile communication networks may have to analyze purposes and service requirements of each UE and maintain optimized settings. Moreover, in order to effectively support each UE and services, the networks may have to be operated so as to be able to continually provide desired levels of services at minimum costs, through identification of the characteristics of each UE and optimization and automation of the settings and maintenance.

According to an embodiment of the disclosure, with respect to the executions, such as operating wireless and core networks, guaranteeing the quality of service, providing optimized services, etc., information associated with present network situations and services may be analyzed and used by collecting data occurring in past or present networks. The use of such network analytics information may provide information for efficiently supporting the UE mobility, the network function performance, user's service satisfaction, slice quality management, optimization of the traffic path, reduction of power consumption of base stations and core networks, detection of abnormal UEs and traffics, etc. Also, the network analytics information may be used to complement basic functions executed in previous core networks, such as mobility management, session management, or policy management, or to improve the efficiency of the same. According to an embodiment, the network analytics information may be basically generated by collecting and analyzing data that occurred in a network in the past and may provide statistical or numerical values or may enable prediction of values with respect to predetermined future time points. For example, the analytics information, such as analysis/prediction of mobility locations or mobility paths of a predetermined UE, analysis/prediction of load information of a predetermined network function, etc., may be provided. In the 5G mobile communication system, the function of providing the analytics information may be performed by an NWDAF.

According to an embodiment, the NWDAF may include specific functions to perform the analytical function. As representative examples, the NWDAF may perform functions, such as collection of network information, storage of collected information, learning, storage of models, inference, etc. In this situation, each NWDAF instance may provide only some of the specific functions. In addition, models for providing network analytics information may have different degrees of accuracy and performance, according to designs and training data of the models. A plurality of NWDAFs provide the same analytics information, but when algorithms for generating the analytics information are different between the NWDAFs, different results or performances may be provided. Therefore, with respect to selection of an NWDAF instance, the NWDAF instance may have to be selected by considering a purpose of use of the analytics information and the required performance. The disclosure provides a method of selecting an NWDAF instance by taking these characteristics into account. Accordingly, a method of obtaining accurate analytics information, which is appropriate for a purpose of use of analytics information, in an appropriate time point or situation, may be provided.

The effects obtainable in the disclosure are not limited to the above-mentioned effects, and other effects not mentioned may be clearly understood by one of ordinary skill in the art from the description below.

Hereinafter, from among various components included in a core network, examples of devices directly related to the disclosure are described. FIG. 1 illustrates a structural diagram of interaction between components using a service-based interface.

FIG. 1 illustrates a structure of a mobile communication system and entities outside a network, according to an embodiment of the disclosure.

According to an embodiment, an access and mobility management function (AMF) is a device for managing access and mobility of a UE and may perform a function of a UE-core network end point, through which the UE is connected with other devices of the core network through an RAN. Functions provided by the AMF may include, for example, registration of the UE, connection, reachability, and mobility management, access verification/authentication, mobility event generation, etc.

According to an embodiment, a session management function (SMF) may perform a management function of a protocol data unit (PDU) session of the UE. For example, the SMF may perform functions, such as session establishment, correction, and dismissal, session management through maintenance of a tunnel between a user plane function (UPF) and an access network (AN), required for the session establishment, correction, and dismissal, UE's IP address allocation and management, an ARP proxy function, user plane selection and controlling, traffic processing controlling in the UPF, charge data collection controlling, etc.

According to an embodiment, a policy control function (PCF) may determine and grant policies with respect to access/mobility/session management, applied by the AMF and the SMF. For example, the PCF may govern behaviors of the entire network and provide policies that have to be carried to network functions (NFs) included in a control plane. Also, the PCF may access a plurality of pieces of information associated with determination of the policies by accessing a unified data repository (UDR).

According to an embodiment, a network exposure function (NEF) may take charge of a function of transmitting an event occurring in a mobile communication network and a supporting capability to the outside or receiving the same. For example, the NEF may perform a function of safely provisioning information of an external application to a core network, transformation of local/external information, redistribution of a function received from another NF after storing the function in the UDR, etc.

According to an embodiment, a unified data management (UDM) and the UDR are independent network functions. However, according to an embodiment of the disclosure, functions and roles of the UDM and the UDR are substantially the same, and thus, they are simultaneously described. The UDM may perform, for example, generation of AKA authentication information for 3GPP security, user identifier (ID) processing, reverse concealment of a subscriber concealed ID (subscription permanent identifier (SUPI)), management of a list of NFs supporting a current UE, subscription information management, short message service (SMS) management, etc. The UDR may perform, for example, a function of storing and providing subscription information managed by the UDM, data structured for exposure, and pieces of application data related to the NEF or services.

According to an embodiment, the UPF may process the actual user data and may process a packet such that a packet generated by a UE is transmitted to an external data network or data provided from the external data network is transmitted to the UE. Main functions provided by the UPF may include, for example, a function of an anchor between radio access technologies, provision of connectivity between a PDU session and an external data network, packet routing and forwarding, packet inspection, user plane policy application, composition of a traffic use report, buffering, etc.

According to an embodiment, an NWDAF may collect an event or information occurring in a network and may transmit statistics, prediction, and recommendation information associated with specific information to the NF, the AF, and the OAM by using an instrument, such as an analytical instrument, machine learning, or the like. For example, the NWDAF may perform functions, such as collection of data from the NF/AF/OAM, NWDAF service registration and metadata exposure, and provision of network analytics information to the NF/AF. That is, based on the collected network data, the NWDAF may analyze data through intelligence technologies, such as machine learning, and provide a result value of the analysis to other 5G core network functions (for example, the NF, the AF, or the OAM), thereby contributing to the optimization and improved performance of each NF. Hereinafter, an NWDAF and an NWDAF instance may be interchangeably used, in this disclosure. That is, in descriptions below, an operating method of an NWDAF instance may denote an operating method of an NWDAF.

According to an embodiment, although not illustrated in FIG. 1, a UE radio capability management function (UCMF) may perform a function of storing and providing mapping information between an ID of a radio access-related function of a UE, the ID being assigned by a public land mobile network (PLMN) or a manufacturer, and an actual function, in the form of a dictionary.

According to an embodiment, an AF may perform a function synchronized with a core network of the 3GPP for providing a service. The AF may be largely divided into a trusted case and an untrusted case, and the trusted AF may use services of NFs in the core network without an additional intermediate function, such as the NEF. Representative functions provided by the AF may include transmission of a network path preferred by an application (an application influence on traffic routing), use of a network information exposure function, interaction with a policy framework for a policy control, IMS-related interaction, etc.

According to an embodiment, the OAM may denote a device for generally managing a mobile communication network including a base station and a core network. For example, the OAM may perform functions related to operation, management, maintenance, provision, problem solving of a communication network. Also, the OAM may perform an inspecting and configuring function such that functions of each base station and the core network seamlessly operate according to the design and the policies. The OAM is a concept encompassing all of instruments, procedures, etc. related to management, and may not refer to a specific device and may include all instruments, software, procedures, etc. used by a network manager for management.

A UE may be connected with an RAN and may access a core network device of a network. The core network of the network (for example, a 5G network) may include the functions described above. The RAN may include a 5G-RAN and may denote a base station providing a wireless communication function to the UE. The UE may access the AMF through the base station and may exchange a control plane signaling message with the 5G core network. Also, the UE may access the UPF through the base station and may exchange user plane data with a data network (DN).

A structural diagram of an upper level of entities included in the core network is illustrated in FIG. 1.

According to the standards defined in the 3GPP, an NWDAF is composed of one architecture entity, according to a system configuration. However, when the NWDAF is subdivided to actually support an operation of the NWDAF, the NWDAF may be composed of specific functions of data collection, a data storage/lake, data learning/training, a model library repository, an inference engine, and an interface, and each specific function may further be subdivided according to a function. The specific structure of the NWDAF is illustrated in FIG. 2.

Figure 2:
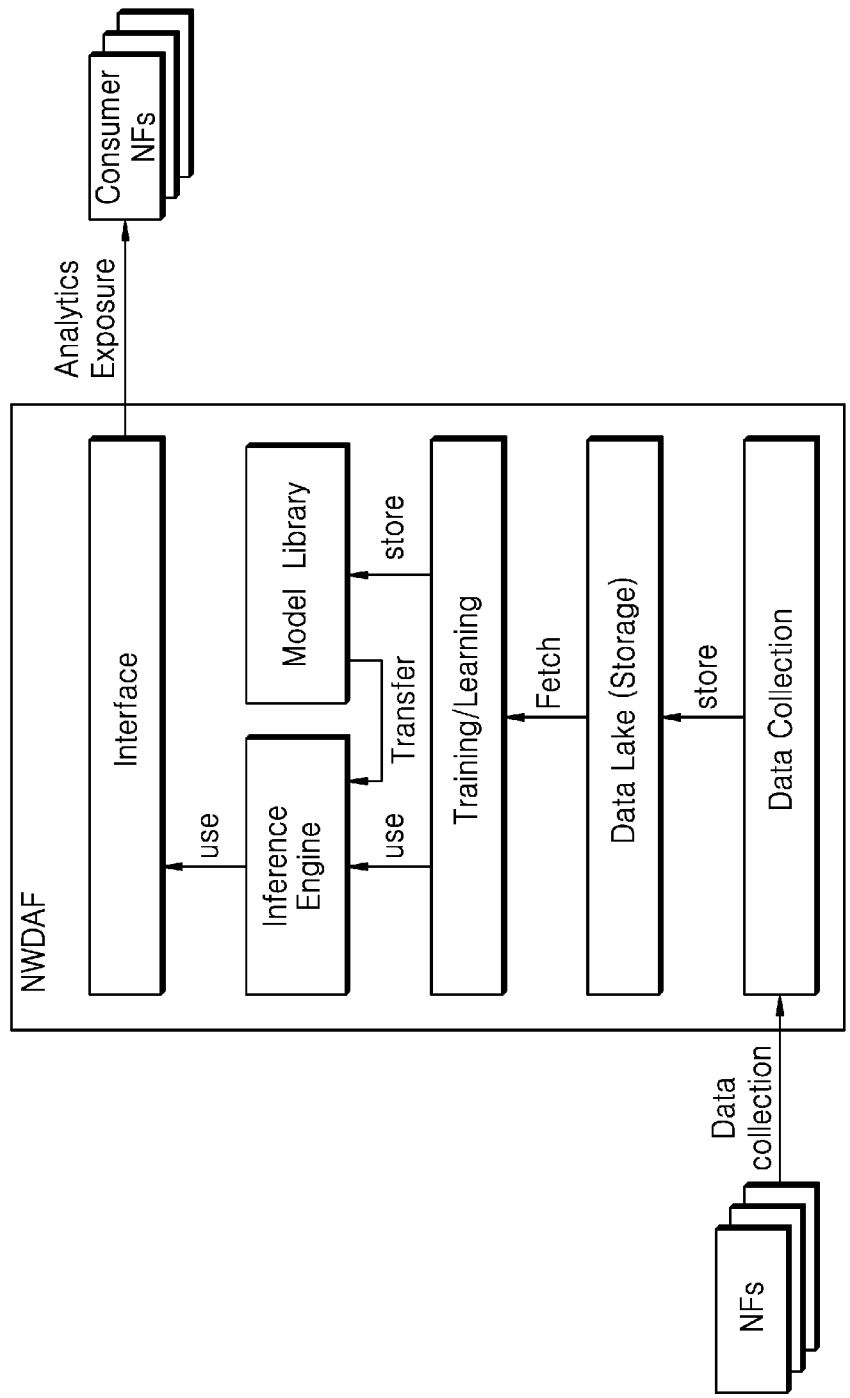
FIG. 2 illustrates a structure of a network data analytics function (NWDAF) subdivided into specific functions, according to an embodiment of the disclosure.

FIG. 2 illustrates a structure of an NWDAF subdivided into specific functions, according to an embodiment of the disclosure.

Referring to FIG. 2, the NWDAF in FIG. 2 may include a data collection function for collecting data in connection with an NF, an AF, OAM, or a UE, in order to perform data collection. According to an embodiment, the data collection function may transmit collected data to a repository so that other specific functions may use the collected data. A data learning function using the collected data may generate a model by applying various analytical methods, such as machine learning, artificial intelligence, trend analysis, statistical analysis, etc. The generated model may be stored in a model repository. The model stored in the repository or a model currently trained may be used by an inference engine to obtain a specific analysis value or prediction value. Lastly, there may be an interface performing functions of receiving a request for analytics information from the NF, the AF, or the OAM (commonly referred to as a consumer FN) using the services of the NWDAF, requesting the analytics information from the inference engine, and transmitting again a result value thereof. Also, analytical platforms for managing a life cycle of each piece of the analytics information or providing resources and an execution environment for each model of the analytics information to operate, may be additionally included. The disclosure is described based on the aspect that services included in the NWDAF may be subdivided into the specific functions described above. However, the disclosure is not limited to the configuration that the NWDAF includes the specific functions described above.

According to an embodiment, NWDAF instances driving the analytics information by having actual resources may not operate by locally executing all of the functions described above. Rather, other functions may be generated as the NWDAF instances by selectively combining the one or more of the functions according to necessity. For example, an instance, a main purpose of which is data collection, may operate as an instance having only the data collection function and a data storage function. Likewise, an instance calculating and providing analytics information may be generated as a type of instance selectively performing only an inference function and an interface function. Thus, in the core network of the mobile communication system, there may be a plurality of NWDAF instances having various purposes. Also, for a user or an NF attempting to use the NWDAF analytics information, it is essential to discover, in advance, an NWDAF instance appropriate for the purpose. In the process of selecting an appropriate NWDAF instance, not only a specific function included in the NWDAF instance, but also a resource capacity and a load level of a current time point, a serving area, etc. may have to be comprehensively taken into account. As described above, when not only the specific function included in the NWDAF instance, but also the resource capacity and the load level of the current time point, the serving area, etc. are comprehensively taken into account, the NWDAF instance for providing an optimum result may be selected. According to an embodiment, selecting of the NWDAF instance may also be referred to as selecting of a service instance or selecting of a service.

According to an embodiment, an NWDAF instance illustrated in FIG. 2 may include at least one service instance. For example, the service instance may include a service instance performing a data collecting function for collecting data from NFs, a service instance performing a storage function, a service instance performing a training and learning function, a service instance performing an inference engine function, and an interface service instance receiving a request for analytics information from a model library in which a model generated through learning may be stored and consumer NFs and returning a result with respect thereto.

According to an embodiment, purposes of selecting the NWDAF instance may be classified as below.

Figure 3:
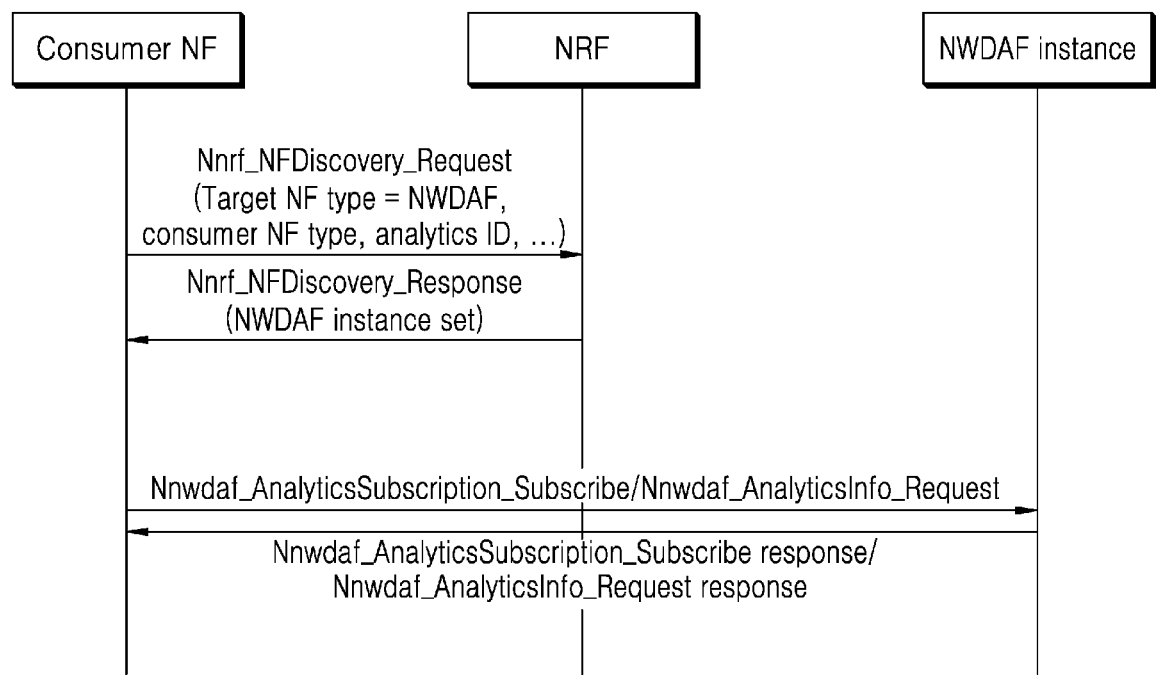
FIG. 3 is a sequence diagram illustrating a procedure in which an entity using NWDAF analytics information, such as a network function (NF), an application function (AF), operation, administration, and maintenance (OAM), etc., discovers an NWDAF instance by using a network repository function (NRF), according to an embodiment of the disclosure.

First, an example in which other NFs constituting a core network use an NWDAF to use analytics information provided by the NWDAF is illustrated in FIG. 3.

FIG. 3 is a sequence diagram illustrating a procedure in which entities using NWDAF analytics information, such as an NF, an AF, OAM, etc., discover an NWDAF instance by using a network repository function (NRF).

For example, there may be a method for an AMF to subscribe to mobility analytics information of a UE that is provided by the NWDAF. This use method is a general aspect of a general service-based architecture, and each NF may select an NWDAF instance providing required network analytics information by using the NRF or a local policy and use the service. When, like an untrusted AF, an entity attempting to use the NWDAF is outside a core network, a service of the NWDAF may be used through an NEF.

Figure 4:
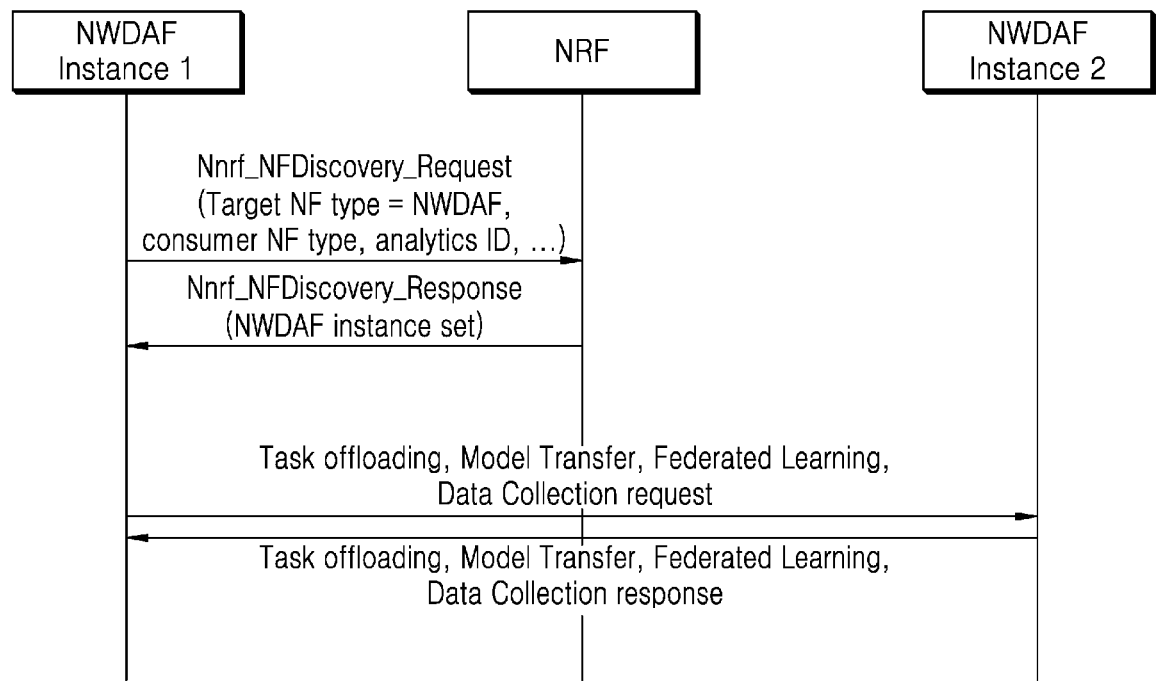
FIG. 4 is a sequence diagram illustrating a procedure in which an NWDAF instance discovers another NWDAF instance, according to an embodiment of the disclosure.

Second, as the purpose of discovering an NWDAF instance, there may be a case in which an NWDAF instance discovers another NWDAF instance to use a function provided by the other NWDAF instance, as illustrated in FIG. 4.

FIG. 4 is a sequence diagram illustrating a procedure in which an NWDAF instance discovers another NWDAF instance, according to an embodiment of the disclosure.

Referring to FIG. 4, when it is possible to decompose functions of an NWDAF and configure each of NWDAF instances by selectively selecting the functions, as described above, a method of discovering another NWDAF instance, via an NWDAF instance, may be used. In the disclosure, representative purposes of this discovering method may include task offloading of calculation of the analytics information, transferring of an analytics model, federated learning, sharing of collected data, etc.

A first embodiment of the disclosure may include a method of configuring an NWDAF instance through a combination of decomposed functions.

A previous NWDAF may be identified, for NFs included in a core network, as a single type of NF. In order to efficiently use the NWDAF and enhance the function thereof, the NWDAF modeled as a single function may be decomposed into specific functions. These specific functions may be referred to as service instances. Representative decomposable specific functions may include data collection, a data storage/lake, data learning/training, a model library/repository, an inference engine, and an interface. Data collection may take charge of a function of collecting network data, such as an occurring event, from other NFs, the AF, or the OAM existing in the core network and of collecting information for the NWDAF to identify a current situation and learn data. The data storage may perform a function of a storage for keeping the data collected by the data collection. Also, the data storage may perform a function of transferring data so that the data learning/training or the inference engine may use the data. The data learning/training may perform a function of learning and modeling given network information by using data collected by a model, such as machine learning, artificial intelligence, statistical/analytical algorithms, etc., generating an analytical value by using data. The model repository may perform a function of a repository for storing a result of the data learning/training or storing another model developer or a purchased model so that the result or the other model developer or the purchased model may be used. The inference engine may perform a function of calculating the request for analytics information and returning the request by using a data model. Lastly, the interface may perform a function of providing a platform for performing communication with the entities in the core network, such as the NF, the AF, and the OAM, using the analytics information.

In this disclosure, a method of configuring an NWDAF instance through a combination of the specific functions of the NWDAF described above and efficiently operating NWDAF instances may be provided. An example thereof is illustrated in FIG. 5.

Figure 5:
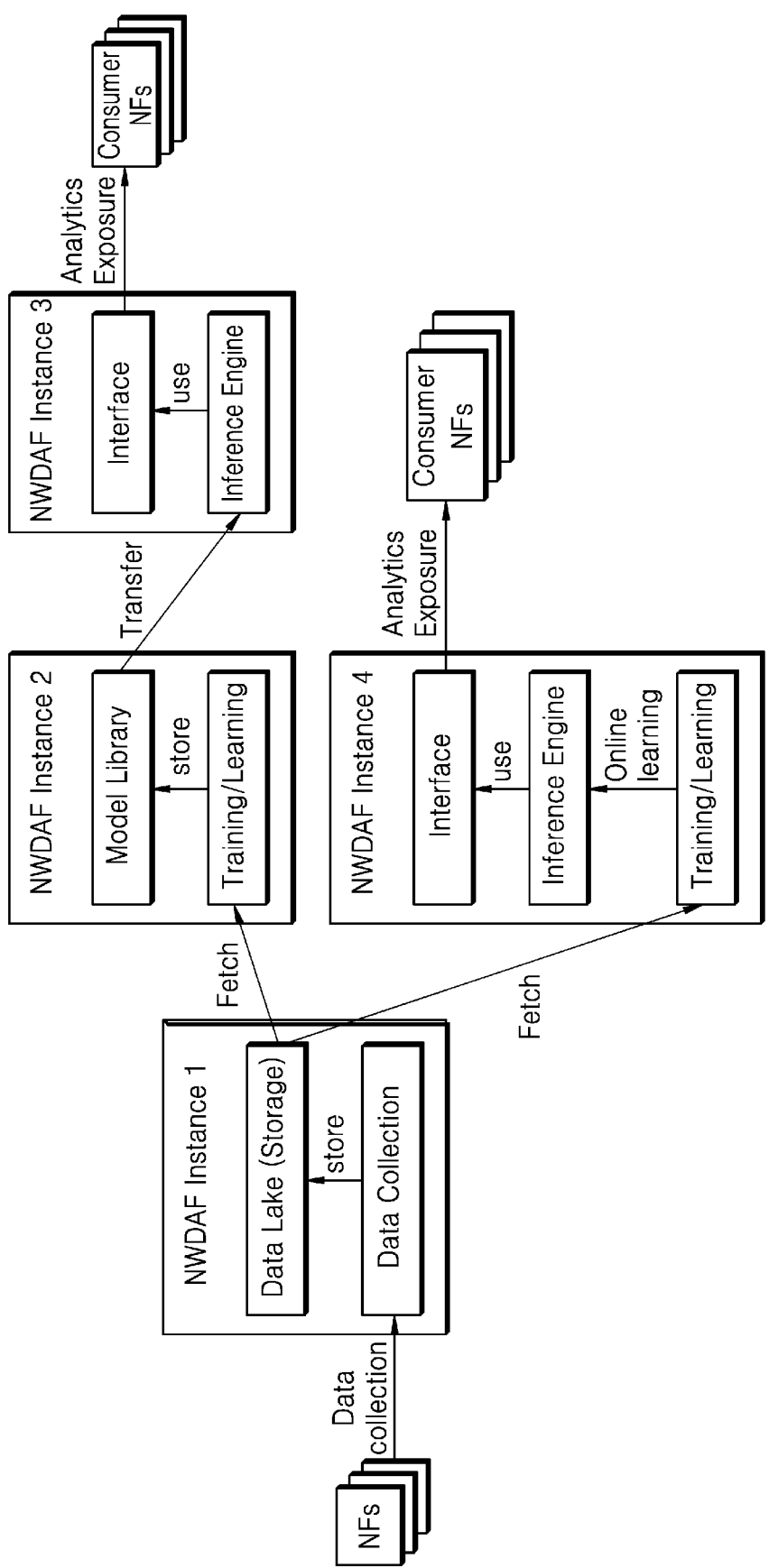
FIG. 5 illustrates an example of a method of composing an NWAF instance as a combination of specific functions, according to an embodiment of the disclosure.

FIG. 5 illustrates an example of a method of composing an NWAF instance as a combination of specific functions, according to an embodiment of the disclosure.

NWDAF Instance 1 of FIG. 5 is an instance performing data collection as a main function. The NWDAF Instance 1 may be composed of a combination of a function of collecting data from an NF, an AF, OAM, etc. and a function of storing the collected data and may perform the functions of data collection and storage. NWDAF Instance 2 may perform a function of training a model by using the data collected by NWDAF Instance 1 and storing the trained model in a model repository so that the trained model may be used by other entities. NWDAF Instance 3 may be composed of an inference engine and an interface for performing a function of performing communication with the entities using analytics information, such as the NF, the AF, the OAM, etc., to receive a request for analytics information and calculating and returning the requested analytics information. Here, in order to generate the requested analytics information, the inference engine may receive, from a model repository, a model corresponding to the requested analytics information, and use the received model. Lastly, NWDAF Instance 4 may perform a function of providing an analytics model related to on-line learning, whereby the model is not provided in advance, and data occurring in a network is collected in real time and reflected in the model. Also, NWDAF Instance 4 may be composed of a combination of specific functions, namely, the interface, the inference engine, and the model learning. That is, NWDAF Instance 4 may be composed of a combination of NWDAF Instance 2 and NWDAF Instance 3 described above.

Figure 6:
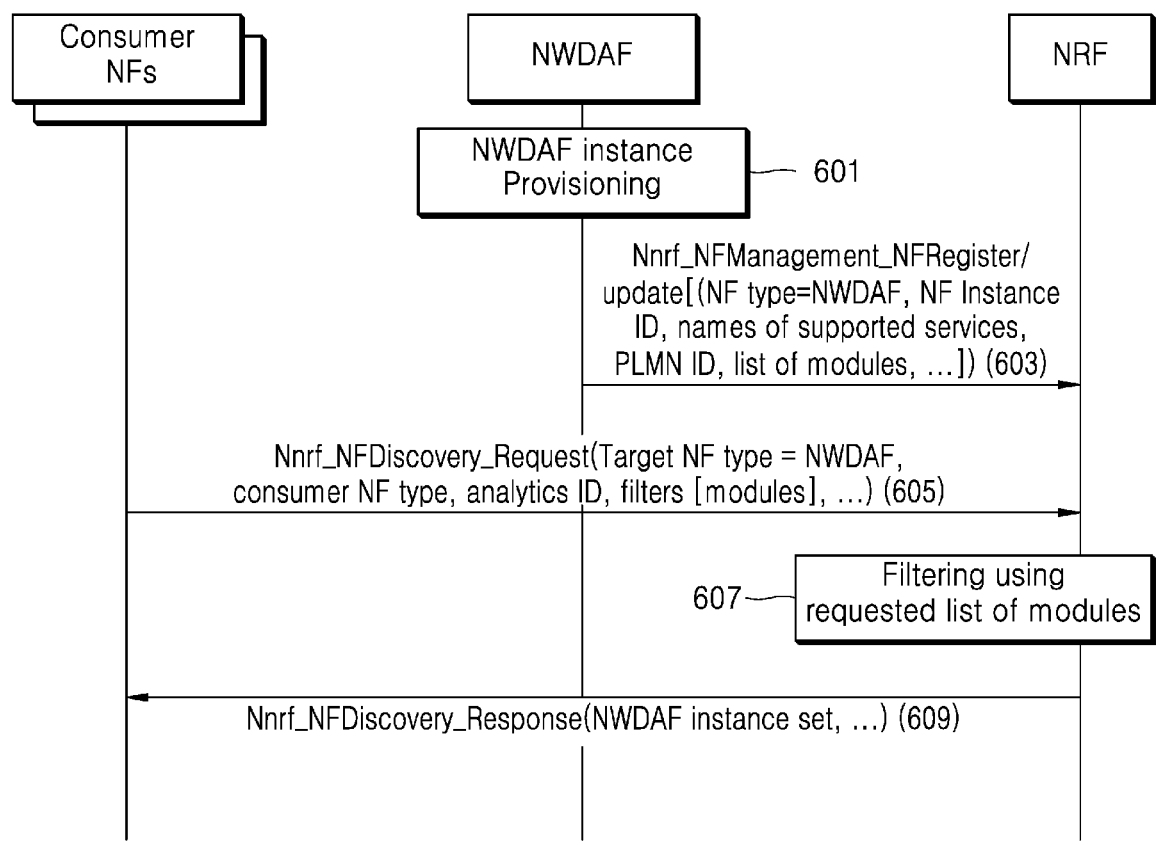
FIG. 6 is a sequence diagram illustrating a procedure in which an NWDAF instance which is appropriate for a purpose is discovered and selected by using an NRF, according to an embodiment of the disclosure.

The disclosure may include a method of storing specific functions included in the NWDAF instance in an NRF and a method, performed by an NF or another NWDAF attempting to select the NWDAF, of efficiently selecting an instance. In this disclosure, a unit for providing the specific functions of the NWDAF described above may be referred to as a module of the NWDAF. For example, in FIG. 5, NWDAF Instance 1 may be composed of a data collection module and a data storage module. In this disclosure, the modules included in the NWDAF instance may be registered in the NRF, together with the NWDAF instance, and thus, an NWDAF instance which may provide a function corresponding to the purpose of discovering the NWDAF instance may be selected. The procedure according to the disclosure is illustrated in FIG. 6. According to an embodiment, a module which may be included in the NWDAF instance described above may be referred to as a service instance.

FIG. 6 is a sequence diagram illustrating a procedure in which an NWDAF instance appropriate for a purpose is discovered and selected by using an NRF, according to an embodiment of the disclosure.

Referring to FIG. 6, in operation 601, an NWDAF instance may be generated or a structure thereof may be changed. That is, NWDAF instance provisioning may be performed.

In operation 603, the NWDAF instance may be registered to the NRF. For the NWDAF instance to be registered to the NRF as an NF, an NF type, an NF instance ID, names of supported services, a PLMN ID, and pieces of additional information may be registered to the NRF by using a service of Nnrf_NFmanagement_NFRegister. Here, according to an embodiment of the disclosure, in addition to the information used for the registration of the NWDAF instance to the NRF described above, a list of modules included in the NWDAF instance may additionally be registered to the NRF. In this process, when a previous configuration of modules of an NWDAF is updated or a state of each module is changed, Nnrf_NFmanagement_NFupdate may be used.

In operation 605, an NF, an AF, and OAM (hereinafter, consumer NFs) attempting to use services provided by the NWDAF may request a list of NWDAF instances appropriate for purposes from the NFR by using a service of Nnrf_NFDiscovery_Request provided by the NRF. Here, NWDAF discovering conditions that are used may include a service name, an NF type of a target NF, an NF type of a service consumer, and pieces of additional information. The consumer NFs may transmit, to the NRF, the information which may be used as the discovering conditions described above by including the information in a request for discovering the NWDAF. Here, the consumer NFs may additionally provide, to the NRF, a list of modules or modules, required according to purposes of the consumer NFs, through a filter. That is, the consumer NFs may request an NWDAF instance composed of the required modules, from the NRF.

In operation 607, the NRF may select a set of NWDAF instances corresponding to the NF discovering request transmitted in operation 605. Here, the list of modules additionally transmitted in operation 605 may be used.

In operation 609, the NRF may return the set of NWDAF instances selected in operation 607 to the consumer NFs.

A second embodiment of the disclosure may include a method of selecting an instance or a model by using a purpose score based on feedback.

When there are a plurality of NWDAF instances, the second embodiment of the disclosure may provide a method of selecting an NWDAF instance which may accord with a purpose and provide a high level of satisfaction with respect to analytics information. An NF using the analytics information provided by an NWDAF may receive the analytics information and then may perform evaluation of the received analytics information. Representative assessment information used for this evaluation of the analytics information may include accuracy. In addition, a degree of satisfaction according to a value of the analytics information may vary according to a purpose of use of the network analytics information. Even for the analytics information having the same accuracy, evaluation of the use experience of the analytics information may vary depending on the purpose of use or a policy of a communication operator. For example, assuming that a mobility speed of a predetermined UE is 100 km/h, two analytical models may provide prediction analysis values of 90 km/h and 110 km/h, respectively. The both types of analytics information may have the same accuracy (or error). However, when the AMF reflects a setting value of the UE by using the information that the mobility speed of the UE is 110 km/h, a slight resource waste may occur, but a user may experience no quality deterioration, and thus, a higher degree of satisfaction may be obtained than when the information that the mobility speed of the UE is 90 km/h is used. This difference between the results of the analytics information may occur because analytical models operated or collected data may vary for each NWDAF instance. The disclosure may include a method which may be used when an NWDAF is selected by receiving feedback of the accuracy and the degree of satisfaction with respect to the analytics information. Here, an entity providing the evaluation information, such as the accuracy and the degree of satisfaction, may be an NWDAF instance on its own providing the analytics information (self-feedback).

Figure 7:
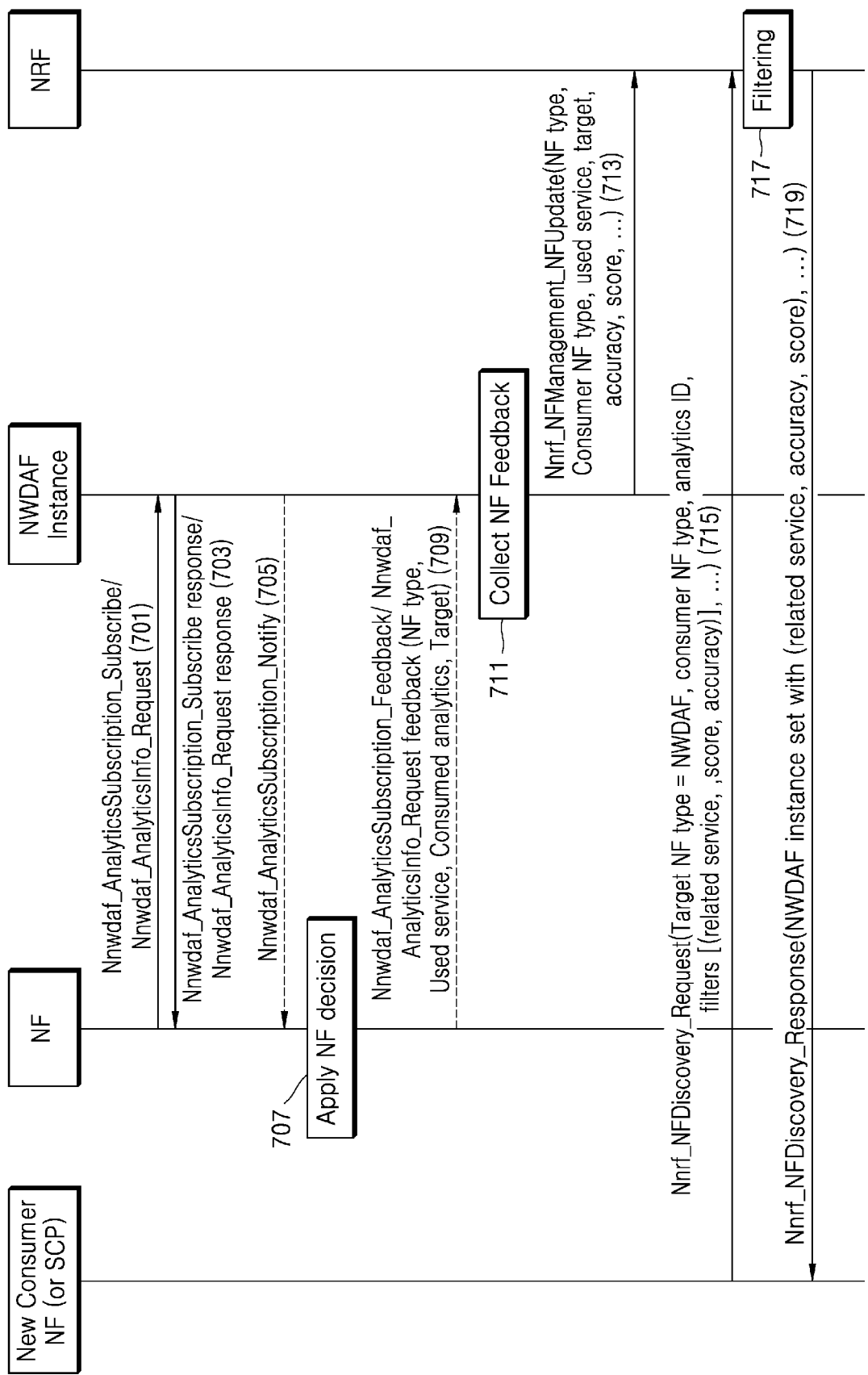
FIG. 7 is a sequence diagram illustrating a procedure of discovering and selecting an NWDAF instance by using feedback information of an entity using analytics information, according to an embodiment of the disclosure.

A procedure for executing the second embodiment of the disclosure is illustrated in FIG. 7.

FIG. 7 is a sequence diagram illustrating a procedure of discovering and selecting an NWDAF instance by using feedback information of an entity using analytics information, according to an embodiment of the disclosure.

In operation 701, an NF (for example, a consumer NF) may request provision of analytics information from a specific NWDAF instance. Here, the service used may be Nnwdaf_AnalyticsSubscription_Subscribe or Nnwdaf_AnalyticsInfo_Request. In operation 703, the NWDAF instance may transmit a response message to the NF in response to the request received from the NF in operation 701. For example, when the NF requests Nnwdaf_AnalyticsSubscription_Subscribe, the NWDAF instance may transmit, to the NF, Nnwdaf_AnalyticsSubscription_Subscribe response by including a subscription correlation ID, etc. related to the subscription in Nnwdaf_AnalyticsSubscription_Subscribe response.

In operation 705, the NWDAF may provide the analytics information requested in operation 701.

In operation 707, the NF (for example, the consumer NF) may make a specific determination by using the analytics information provided from the NWDAF instance or may refer to the analytics information to make such specific determination. When the NF (for example, the consumer NF) makes the specific determination by using the analytics information, this may be applied. Also, when prediction is possible, a result according to the applied determination may be predicted. For example, the described specific determination may include a determination by an AMF or a network slice selection function (NSSF) in relation to selection of a slice instance corresponding to S-NSSAI requested by a specific UE, the determination being made by using information of a slice load level provided by the NWDAF, a determination by a PCF to retain or change a quality of service (QoS) profile by using service experience analytics information provided by the NWDAF, a determination by an SMF with respect to a traffic path of a UE, using load level analytics information of a UPF, a determination by the PCF of a policy and time related to a background data transfer (BDT), using network performance analytics information, a determination of a policy related to access and mobility management (AM) or session management (SM), using analytics information related to an abnormal behavior of a UE, a determination by the PCF or the AMF of service area restriction, using an expected UE behavior pattern, and determinations by the AMF of a registration cycle, a DRX cycle, a minimum connection retaining time duration, etc., using an expected UE behavior pattern. In addition, analytics information provided by the NWDAF may be used for a determination by the SMF or the PCF with respect to an optimal data network access identifier (DANI) of a specific application, a determination by the PCF in relation to a radio/frequency selection priority (RFSP) index, and a determination by the NEF or the PCF in relation to detection and use of a new application.

In operation 709, the NF (for example, the consumer NF) or a network operator may calculate the accuracy and satisfaction of the provided analytics information as numerical values and feed the calculated numerical values back to the NWDAF instance. The feedback information may include information, such as a type of consumer NF, a used service, a use target, accuracy, and the degree of satisfaction, and the NF may transmit this feedback information to the NWDAF instance.

According to an embodiment, an analytics information target period, a preferred level of accuracy, and a time when analytics information is needed, which are requested when the NF (for example, the consumer NF) requests the analytics information, and filter information included in the request, may be selectively included in the feedback information.

According to an embodiment, according to the characteristics of the analytics information, the information included in the feedback information may include a combination of only one or more parts of the information described above. In this disclosure, when a subscription service is used as a method of transmitting feedback to the NWDAF instance, the feedback information, referred to as Nnwdaf_AnalyticsSubscription_Feedback, may be transmitted to the NWDAF instance, and when an analytics information request service is used, the feedback information, referred to as Nnwdaf_AnalyticsInfo_Request_Feedback, may be transmitted to the NWDAF instance.

In operation 711, the NWDAF instance may collect the feedback information received in operation 709. When a result obtained via cumulative collection of the feedback information is greater than a predetermined critical value or corresponds to a predetermined period, the NWDAF instance may determine to update NFProfile in the NRF. For example, as a case in which the result of accumulated collection described above exceeds a predetermined critical value, when the accuracy or the degree of satisfaction of the analytics information is greater than or less than a predetermined numerical value, such as 90%, the NWDAF instance may determine to update NFProfile in the NRF. Alternatively, when a predetermined cycle is used, at a time point after a predetermined time period, for example, 24 hours, the NWDAF instance may update NFProfile of the NWDAF instance in the NRF. The predetermined critical value or values, such as the predetermined cycle, may be determined according to a local policy.

In operation 713, when it is determined to update NFProfile in the NRF in operation 711, the NWDAF instance may compose and request NFProfile or factors including new information from the NRF. Here, Nnrf_NFManagement_NFUpdate may be used. Information transmitted in this case may include information about a consumer NF type, a used service, a use target, the accuracy, and a satisfaction score. According to an embodiment, the consumer NF type may denote a target using the analytics information, and the used service may denote a service associated with a determination performed by the consumer NF by using the analytics information. Also, the use target may denote a target (for example, a UE or a predetermined NF, a traffic transfer path, or the like) to which the determination is applied. In addition to the consumer NF, the used service, and the use target, a result evaluated based on the accumulated accuracy and satisfaction scores may be transmitted to the NRF in operation 711. According to an embodiment, in order to provide relatively more accurate feedback information, the analytics information target period, the preferred level of accuracy, the time when the analytics information is needed, and the filter information included in the request, which are selectively transmitted in operation 5709, may be provided to the NRF, together with the accumulative evaluation or the feedback result. The NRF receiving these added factors may store the received factors in NFProfile.

In operation 715, a new consumer NF attempting to use the analytics information of the NWDAF may request a list of NWDAF instances providing specific analytics information from the NRF. Here, the new consumer NF may transmit a target NF type, a consumer NF type, and an analytics ID to the NRF as conditions for discovering an NWDAF instance. Additionally, in this disclosure, a service associated with the use of the analytics information, the accuracy, and the degree of satisfaction may be provided to the NRF as filter information. That is, according to an embodiment of the disclosure, the filter information may denote information about a condition used to classify specific information.

In operation 717, the NRF may generate a set of NWDAF instances satisfying the conditions by using the information provided in operation 715.

In operation 719, while the NRF may return the set of NWDAF instances to the new consumer NF, the NRF may additionally transmit a specific related service associated with each of the instances, related accuracy, and the degree of satisfaction.

Figure 8:
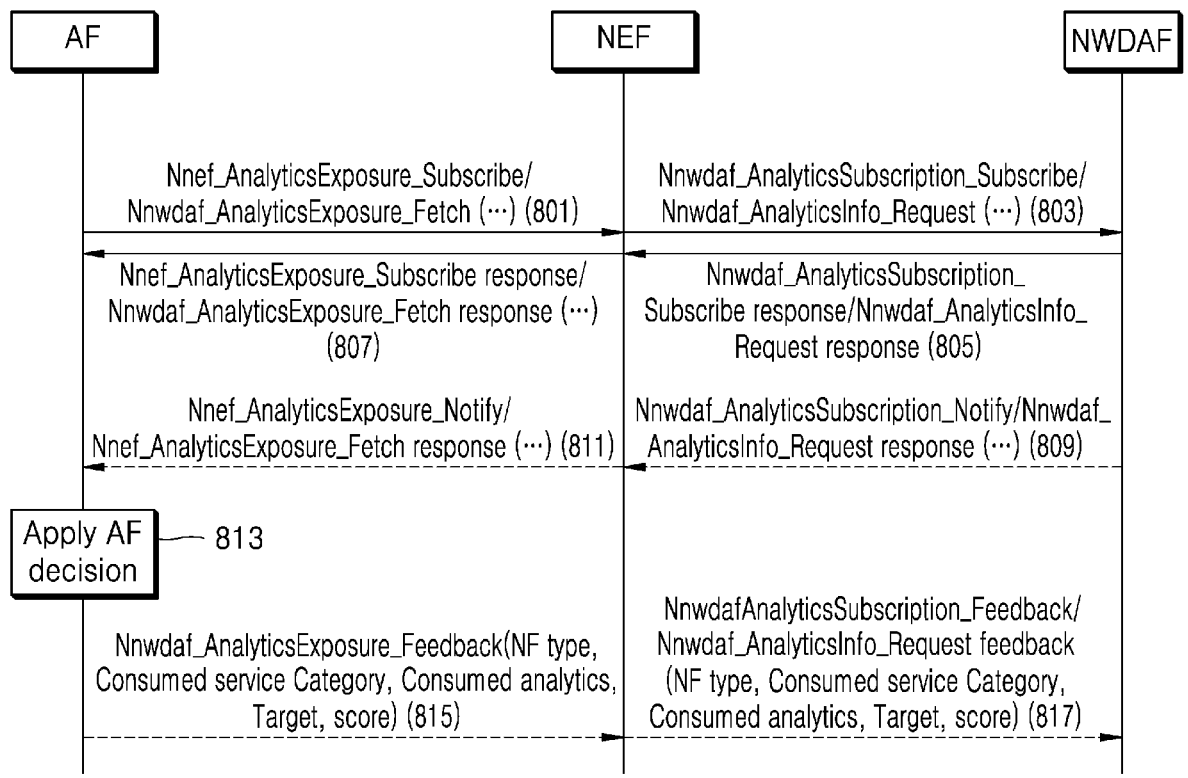
FIG. 8 is a sequence diagram illustrating a method, performed by an AF, of discovering an NWDAF, according to an embodiment of the disclosure.

When the analytics information of the NWDAF is provided to the AF through the NEF, operations 701 through 709 of FIG. 7 may be replaced by operations 801 through 817 of FIG. 8.

FIG. 8 is a sequence diagram illustrating a method, performed by an AF, of discovering an NWDAF, according to an embodiment of the disclosure.

Referring to FIG. 8, in operation 801, the AF may transmit messages of Nnef_AnalyticsExposure_Subscribe or Nnwdaf_AnalyticsExposure_Fetch to the NEF, in order to request the NWDAF to provide the analytics information. By using the same method as operation 701, the NEF may request the NWDAF to provide the analytics information in operation 803. Also, in operation 805, the NWDAF may transmit a response message to the NEF by using the same method as operation 5703.

In operation 807, the NEF may transmit the response message received from the NWDAF to the AF. Also, by using the same method as operation 705, the NWDAF may provide the requested analytics information to the NEF in operation 809.

In operation 811, the NEF may transmit the analytics information received from the NWDAF to the AF. Also, by using the same method as operation 707, the AF may make a specific determination by using the analytics information provided from the NWDAF or may refer to the analytics information to make such specific determination, in operation 813.

In operation 815, the AF may transmit, to the NEF, feedback information including numerical information of the accuracy and the degree of satisfaction of the provided analytics information. Also, by using the same method as operation 709, the NEF may transmit the feedback information to the NWDAF in operation 817.

A third embodiment of the disclosure may include a method of discovering and selecting an NWDAF instance for sharing collected data.

According to an embodiment, a basic operating method of the NWDAF may include collecting a mass volume of data occurring in a network and generating, from the collected data, a model required for operation and management. A method of obtaining or predicting, based on this model, statistical information related to a specific phenomenon or a target behavior may be used. The model used or trained in this case may include not only various statistical models, but also models using machine learning, artificial intelligence, or a method such as deep learning. An operation that has to be prioritized in this process may be to collect data for generating or using the model.

When a plurality of NWDAFs in a core network collect data from predetermined NFs, respectively, from the perspective of the NFs providing the data, a load for collecting and reporting overlapping data may occur. Also, from the perspective of a network included in the core network, there may be a defect that a plurality of pieces of signaling may have to be generated for transmission of the same data. Therefore, to solve the problems described above, a method of composing instances for collecting data by subdividing specific functions of an NWDAF and having the collected data shared by a plurality of NWDAF instances may be used. Through this method, the NF providing the data may communicate with a single NWDAF in charge of data collection, and not all of NWDAFs may have to collect and store a countless number of pieces of network data. Thus, based on this method, a load of the NF and the NWDAF for data collection and processing may be reduced, and the number of signaling messages for transmission of the collected data may be decreased.

The NWDAF represented as a single entity may be subdivided into various specific functions as described above, and the disclosure may include a method of composing NWDAF instances by subdividing functions for data collection. A previous NWDAF provides only two types of services, which are services of Nnwdaf_Analytics_Subscription and Nnwdaf_AnalyticsInfo. Thus, a specific function instance for data collection may not be discovered by using a previous service-based interface. To solve this problem, in this disclosure, a method of enabling a specific NWDAF to share a data collection function is described.

In this disclosure, a new service interface may be defined in the NWDAF, with respect to a data collection function related to data collection and data storage. A name of the newly defined interface may be Nnwdaf_DataCollection. The service interface described above may denote a new service for a specific NF to request data collected or to be subsequently collected. The interface provided by the service described above may include Subscribe, Notify, Unsubscribe, Request or Fetch, and Response. According to an embodiment, subscription may denote a request for notification about data when a periodical or predetermined condition is satisfied with respect to data or an event newly collected. The subscription service may be cancelled to stop receiving the notification. The request interface may be an interface for temporarily retrieving previous data and, when predetermined data is requested, may transmit data to an entity of the request through a response. In the case of the subscription and the request, additional factors, such as an event, a condition, a time, a cycle, etc. to perform collection, may be requested together. For example, when a subscription is to be made with respect to an event about location information of a predetermined UE, the following request may be performed. Nnwdaf_DataCollection_Subscribe (Data Name=UE location, Period=12:00 PM-14:00 PM, Target=UE ID1, filter=[(Area of Interest=TAI1, TAI2)]). This request may denote to request notification of a location of a UE having UE ID1, when the UE is located at TAI1 and TAI2 from 12 pm to 2 pm. A procedure according to the disclosure is illustrated in FIG. 9.

Figure 9:
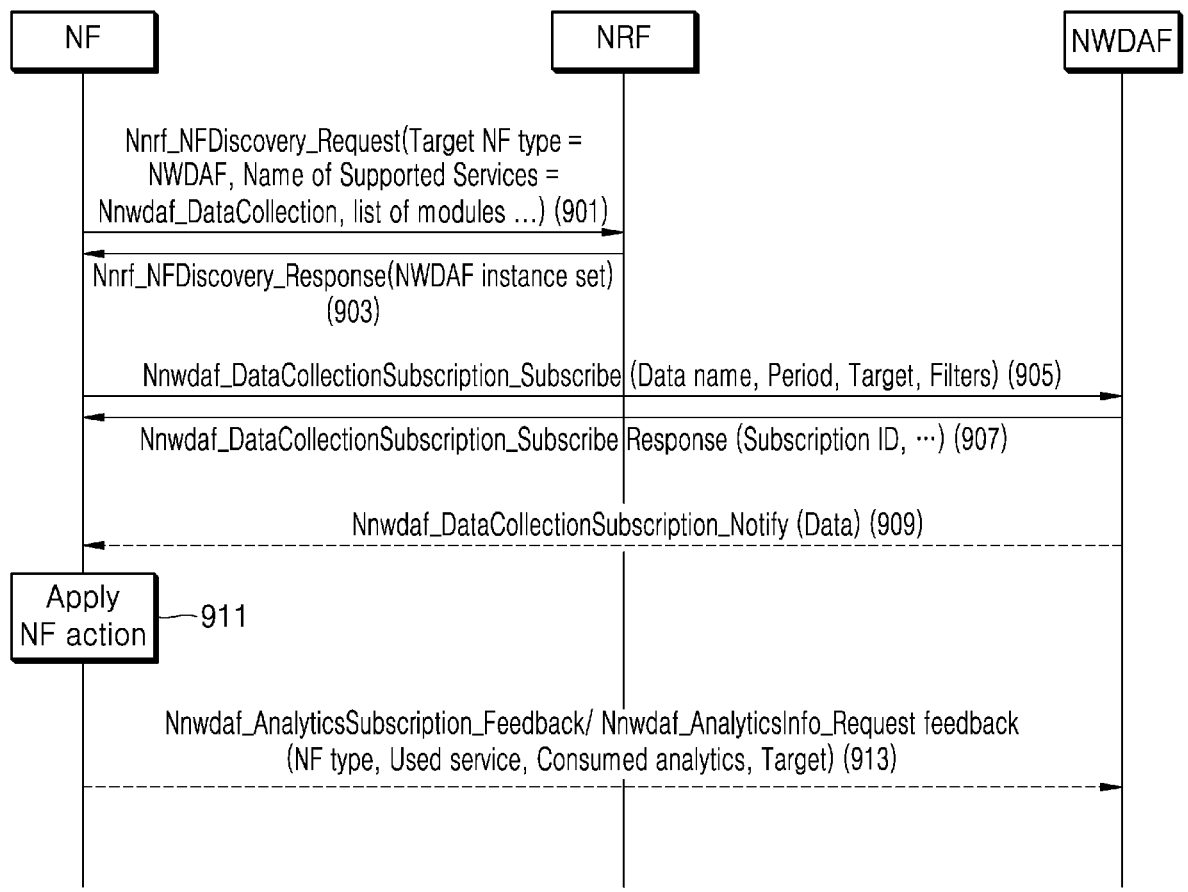
FIG. 9 is a sequence diagram illustrating a method of discovering and selecting an NWDAF for a data collection function, according to an embodiment of the disclosure.

FIG. 9 is a sequence diagram illustrating a method of discovering and selecting an NWDAF for a data collection function, according to an embodiment of the disclosure.

In operation 901, an NF to use a service of DataCollection of the NWDAF may request, by using an NRF, an NWDAF instance providing a service of Nnwdaf_DataCollection. According to an embodiment, in this case, the NF may be an NWDAF instance attempting to perform data collection through another NWDAF instance. Also, in order to additionally identify functions of data collection and a data repository, the NF may provide a name of a model as an additional factor, to explicitly transmit requirements with respect to whether to perform the function of the data repository or the function of data collection.

In operation 903, the NRF receiving the request for the NWDAF instance from the NF may return an NWDAF providing the requested function to the NF.

In operation 905, the NF may call an interface provided by the service of DataCollection from the NWDAF. Here, the interface which may be called may include interfaces, such as Subscribe, Notify, Unsubscribe, Request or Fetch, and Response. For example, FIG. 9 illustrates a procedure of using Subscribe, and as additional factors, information about a data name, a collection period, a target, or filters may be transmitted together.

According to an embodiment, when a condition with respect to predetermined target data is satisfied based on the additional factors described above, the NWDAF may be requested to notify the corresponding data. Also, when the interface of Request or Fetch is used, in addition to the interface of Subscribe, the interface may be requested from the NWDAF, with similar requesting factors being included in the request.

In operation 907, a response message with respect to the call of the interface, transmitted in operation 905, may be transmitted from the NWDAF to the NF. Here, the response message transmitted to the NF may include a subscription ID, etc.

In operation 909, the NWDAF instance having received the request from the NF in operation 905 may notify the NF of collected data, when the NWDAF collects data or an event satisfying the condition.

In operation 911, the NF may perform a related service by using the data notified by the NWDAF. Here, when the NF is another NWDAF instance, the other NWDAF instance may generate analytics information by using the notified data.

In operation 913, the NF may transmit, to the NWDAF, feedback with respect to the accuracy and the degree of satisfaction with respect to the data collection of the NWDAF instance, from which the data is currently received. Through the transmission of the feedback, an operation of selectively selecting an NWDAF instance with respect to predetermined data collection may be supported. For example, there may be a plurality of NWDAF instances providing a service of DataCollection. Here, each of the NWDAF instances of data collection may have a different data collection period and a different data collection target, and thus, according to a purpose of each NF, collected data may be different. Thus, the feedback data for supporting the selecting of the NWDAF instance according to each purpose may be accumulated.

A fourth embodiment of the disclosure may include a method of registering and discovering an NWDAF instance for task offloading.

According to an embodiment, because pieces of network data are in charge of a large number of UEs and a wide region in a country unit, a large volume of data may be generated at an extremely high speed. With respect to the data generated in a mobile communication network in a country unit, it may be difficult for a single NWDAF to collect all of the data and perform calculation for an analysis. To solve this problem, an NWDAF may have to distribute a task with respect to a predetermined request for analytics information and assign the calculation to a plurality of NWDAFs. In this disclosure, the assignment of this calculation may be referred to as task offloading.

According to an embodiment, the task offloading may denote processing the received request for network analytics information separately via a plurality of NWDAF instances and when necessary, integrating, via a predetermined NWDAF, results from the plurality of NWDAF instances, to which the processing of the request for network analytics information is distributed. Here, there may be various references for subdividing the integrated analytics information into smaller units of analytics information, such as a regional reference, a UE reference, an analytics information reference, an instance reference, an NF reference, etc. Based on these various references, the request for network analytics information may be distributed to the plurality of NWDAF instances and processed by the plurality of NWDAF instances. For example, when analytics information for detecting a UE performing an abnormal behavior among all UEs is requested from the NWDAF instance, a plurality of NWDAF instances for each region may participate in generating the analytics information, generating an integrated result, and transmitting the integrated result to an NF having transmitted the request.

Figure 10:
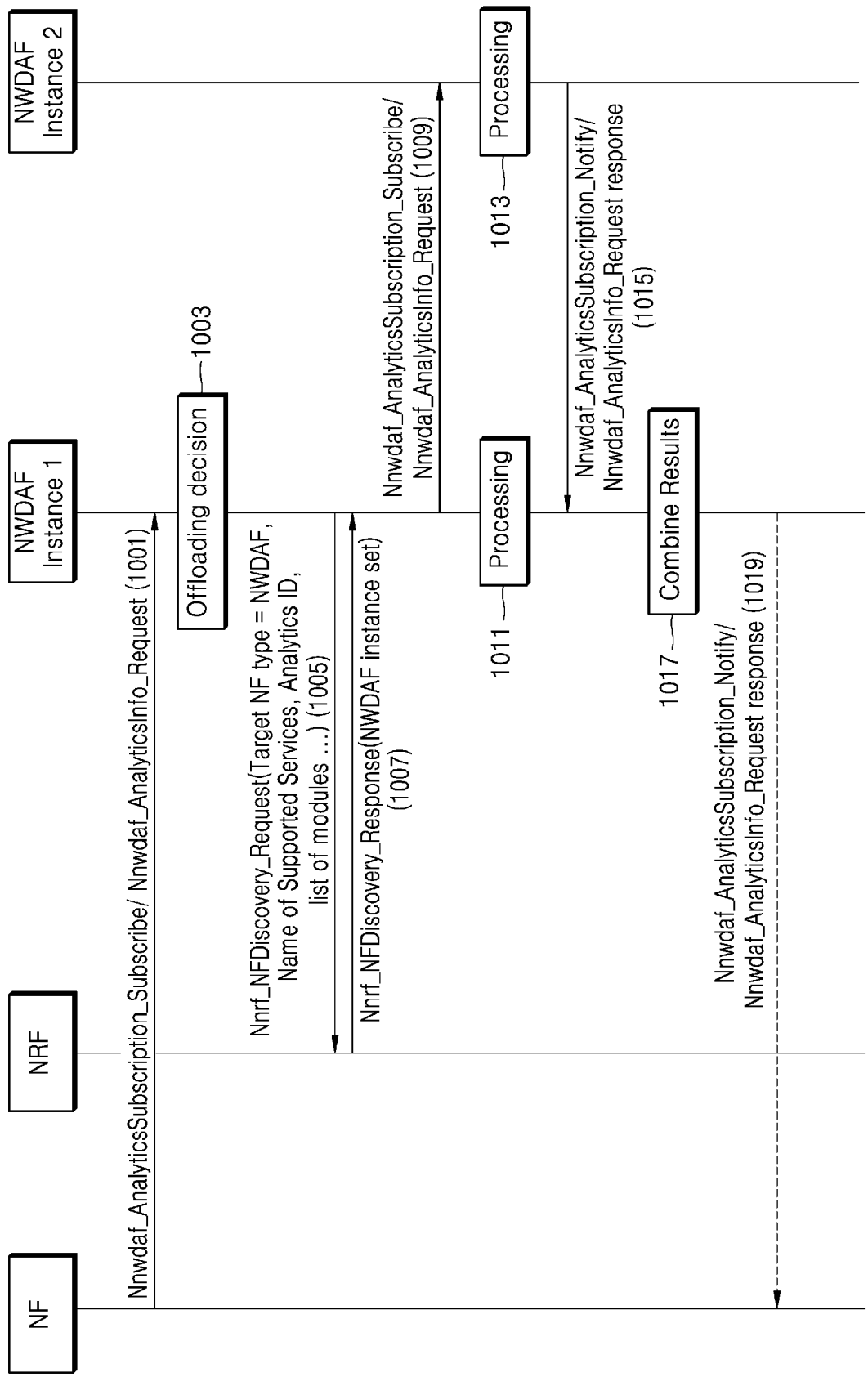
FIG. 10 is a sequence diagram illustrating a method, performed by an NWDAF instance, of discovering and selecting another NWDAF for task offloading, according to an embodiment of the disclosure.

A method of performing task offloading according to the disclosure may be largely divided into two types. The first method is a method, whereby an NWDAF receiving a request for analytics information requests the analytics information from another NWDAF. A procedure of this first method is illustrated in FIG. 10. In an example described in FIG. 10, an NWDAF instance may denote the NWDAF.

FIG. 10 is a sequence diagram illustrating a method, performed by an NWDAF instance, of discovering and selecting another NWDAF for task offloading, according to an embodiment of the disclosure.

In operation 1001, an NF may request analytics information from NWDAF instance 1. Alternatively, an AF or OAM may request the analytics information from NWDAF instance 1.

In operation 1003, NWDAF instance 1 may determine to calculate a task with respect to the requested analytics information by offloading the task to another NWDAF. As references for NWDAF instance 1 to make this determination, a time when the analytics information is needed, a load level of a current NWDAF, a resource capacity of the current NWDAF, analytical accuracy, etc. may be considered. NWDAF instance 1 may make a determination with respect to the offloading by taking into account the references described above.

In operation 1005, NWDAF instance 1 having determined to distribute the task with respect to calculation of the analytics information may transmit a request of Nnrf_NF- Discovery to an NRF to discover another NWDAF instance to which the task is to be distributed. As a requested target, whether an NWDAF, which is a discovery target, supports an analytics information ID for task offloading, may be taken into account. Here, NWDAF instance 1 may additionally transmit whether or not an interface and an inference engine module of an NWDAF are included in a filter of target-related factors. By additionally transmitting whether or not the interface and the inference engine module of the NWDAF are included in the filter of the target-related factors, the NRF may discover an NWDAF instance supporting the task offloading. For example, in operation 1005, NWDAF instance 1 may transmit, to the NRF, a request of Nnrf_NFDiscovery including a target NWDAF type, names of supported services, an analytics information ID, a list of modules, or the like.

In operation 1007, the NRF having received the request may return the NWDAF instance corresponding to the request. For example, the NRF may transmit, to NWDAF instance 1, a response message including information about a set of NWDAF instances to which task may be offloaded.

In operation 1009, when NWDAF instance 2 that is new to offload the task is discovered, NWDAF instance 1 may request the analytics information from NWDAF instance 2. Here, a target, a time, and the accuracy of the requested analytics information may be the same as those of the analytics information requested from NWDAF instance 1 in operation 1001 or may include a smaller range than the same. For example, when NWDAF instance 1 receives the request for analytics information with respect to predicted mobility paths with respect to UEs 1 through 100 in operation 1001, NWDAF instance 1 may request the analytics information with respect to the predicted mobility paths corresponding to the UEs 50 through 100 from NWDAF instance 2 in operation 1009. For task offloading for the calculation of the analytics information, a method of splitting the task may include splitting the task according to a requested target, splitting the task according to a requested region, or splitting the task according to a predetermined time zone. Additionally, when predetermined analytics information is composed of a combination of different analytics information, NWDAF instance 1 may request, from NWDAF instance 2, analytics information that is different from the analytics information requested in operation 1001.

In operations 1011 and 1013, NWDAF instance 1 and NWDAF instance 2 may process the request for analytics information, respectively. Here, NWDAF instance 1 may perform the calculation, except for a portion of the task that is offloaded. In an example of operation 1009, NWDAF instance 1 may calculate only the analytics information corresponding to UEs 0 through 55.

In operation 1015, NWDAF instance 1 may receive a result of the calculation by NWDAF instance 2 from NWDAF instance 2.

In operation 1017, based on information calculated in operation 1011 and information calculated in operation 1013 and received in operation 1015, NWDAF instance 1 may generate the analytics information requested in operation 1001.

In operation 1019, NWDAF instance 1 may transmit final analytics information generated in operation 1017 to an entity having requested the analytics information. That is, NWDAF instance 1 may transmit the final analytics information to the NF.

The second method of performing task offloading according to the disclosure is defining a new service for task offloading in an NWDAF. Compared to the method of requesting the analytics information from the NWDAF, this method has an advantage of more precisely splitting (or offloading) the calculation of the analytics information by transmitting factors related to the offloading. To support this task offloading, a service of Nnwdaf_TaskOffloading may be defined in the disclosure. The service of Nnwdaf_Taskoffloading may be provided by an interface of a request and a response. The request interface may be an interface used to request task offloading from a specific NWDAF instance, and the request interface may include an analytics information ID, an analytics model ID, a target, reporting information, filter information, an analytics model, etc. The NWDAF instance receiving the request of offloading of the analytics information may determine whether or not to execute the request, and based on this determination, may return information indicating acknowledgement or rejection of the request. For rejection, grounds of the rejection of the request, such as a lack of resource, a lack of data, etc., may be included. A procedure for an embodiment of the disclosure described above is illustrated in FIG. 11.

Figure 11:
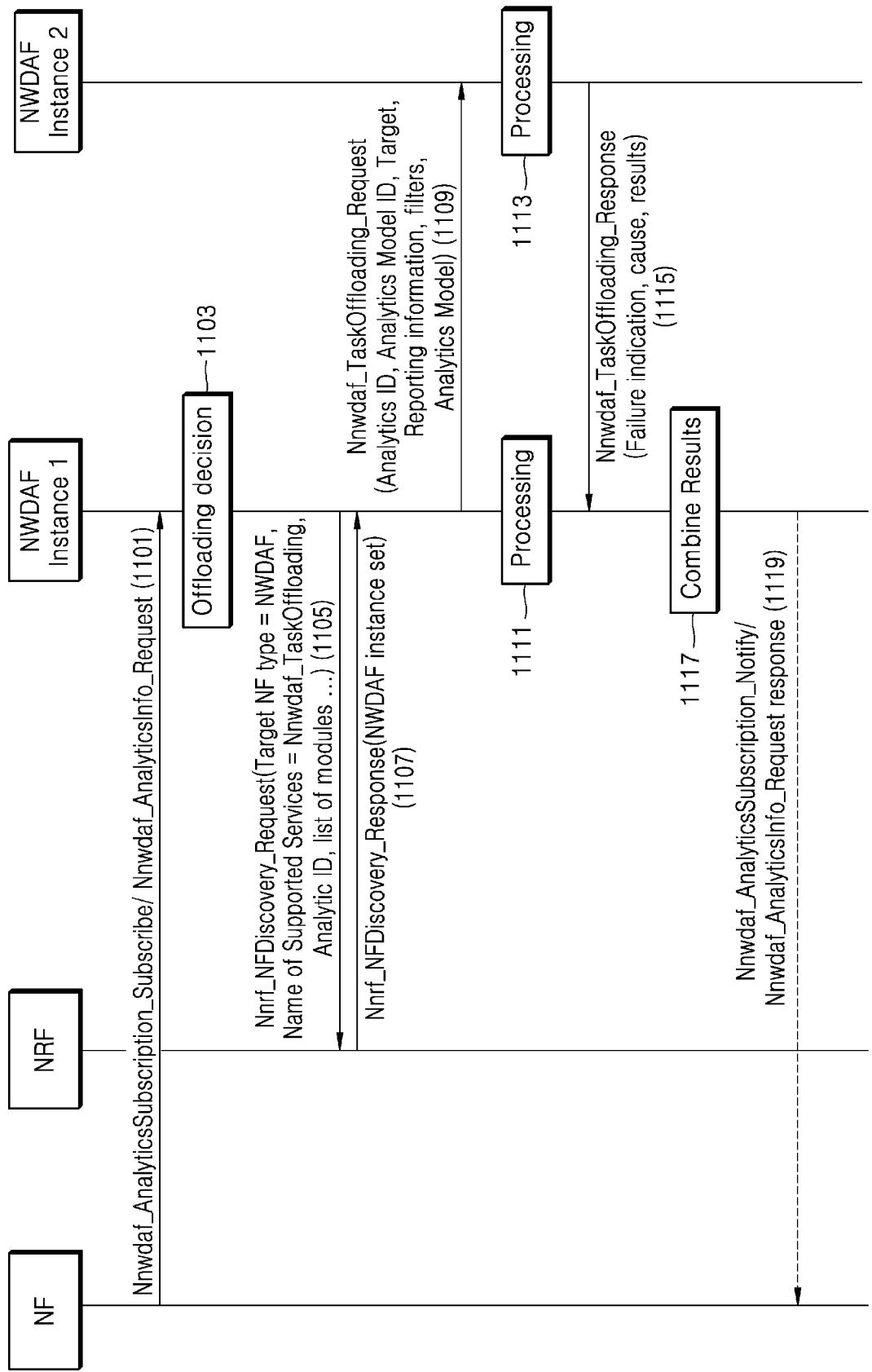
FIG. 11 is a sequence diagram illustrating a method, performed by an NWDAF, of discovering and selecting an NWDAF for task offloading, according to an embodiment of the disclosure.

FIG. 11 is a sequence diagram illustrating a method, performed by an NWDAF, of discovering and selecting an NWDAF for task offloading, according to an embodiment of the disclosure.

Referring to FIG. 11, in operation 1101, an NF may request analytics information from NWDAF instance 1. Alternatively, an AF or OAM may request the analytics information from NWDAF instance 1.

In operation 1103, with respect to the analytics information that is requested, NWDAF instance 1 may determine to calculate the analytics information by offloading the task to another NWDAF (or another NWDAF instance). References for NWDAF instance 1 to make this determination may include a time when the analytics information is needed, a load level of a current NWDAF, a resource capacity of the current NWDAF, analytical accuracy, etc.

In operation 1105, NWDAF instance 1 having determined to distribute the task with respect to calculation of the analytics information may transmit a request of Nnrf NFDiscovery to an NRF to discover another NWDAF instance to which the task is to be distributed. Here, the request of Nnrf_NFDiscovery may include whether or not a target NWDAF instance to which the task is to be distributed supports a service of Nnwdaf_Taskoffloading.

In operation 1107, the NRF may return NWDAF instances supporting the service of Nnwdaf_TaskOffloading to NWDAF instance 1. For example, the NRF may transmit, to NWDAF instance 1, a response message including information about a set of NWDAF instances supporting the service of Nnwdaf_TaskOffloading.

In operation 1109, NWDAF instance 1 may transmit, to NWDAF2 newly discovered, a request of offloading a predetermined task, by using Nnwdaf_TaskOffloading_Request. Factors transmitted with the request may include an ID of the analytics information to be offloaded, an analytics model ID, a target, reporting information, filter information, etc. According to an embodiment, the analytics information ID and the analytics model ID may be selectively included in the request of offloading a predetermined task described above. Here, when a model is one that is used in NWDAF instance 1, NWDAF instance 1 may directly transfer the analytical model to NWDAF instance 2 so that NWDAF instance 2 may perform calculation.

In operations 1111 and 1113, NWDAF instance 1 and NWDAF instance 2 may process the request for analytics information, respectively. Here, NWDAF instance 1 may perform calculation, except for a portion of the task that is offloaded. That is, NWDAF instance 1 may perform calculation with respect to the analytics information except for a portion of the task that is offloaded to NWDAF instance 2.

In operation 1115, when calculation of the offloaded task is completed, NWDAF instance 2 may transmit a calculation result to NWDAF instance 1. According to an embodiment, when NWDAF instance 2 is not able to execute the offloaded task, NWDAF instance 2 may transmit a failure indication to NWDAF instance 1. Here, NWDAF instance 2 may also transmit a cause of the task failure to NWDAF instance 1.

In operation 1117, NWDAF instance 1 may generate the analytics information requested in operation 1101, based on a result of the calculation in operation 1111 and a result of the calculation received from NWDAF instance 2 in operation 1113.

In operation 1119, NWDAF instance 1 may transmit final analytics information generated in operation 1117 to an entity having requested the analytics information. For example, NWDAF instance 1 may transmit the final analytics information generated in operation 1117 to the NF.

A fifth embodiment of the disclosure may include a method of discovering and selecting an NWDAF instance for federated learning.

According to an embodiment, an NWDAF instance may use federated learning, for which it is required to share learning factors according to a type of an analytical model. Federated learning may denote a method whereby many instances share results of separate learning and share the common learning factors to increase the learning efficiency. Thus, a prior negotiation with respect to a learning model to be used and factors to be shared may be required between instances. In this disclosure, a service for the negotiation between the instances with respect to the federated model and the factors to be shared may be provided. This service may be referred to as Nnwdaf_FederatedLearning_Association. According to an embodiment, a procedure for performing the federated learning described above is illustrated in FIG. 12.

Figure 12:
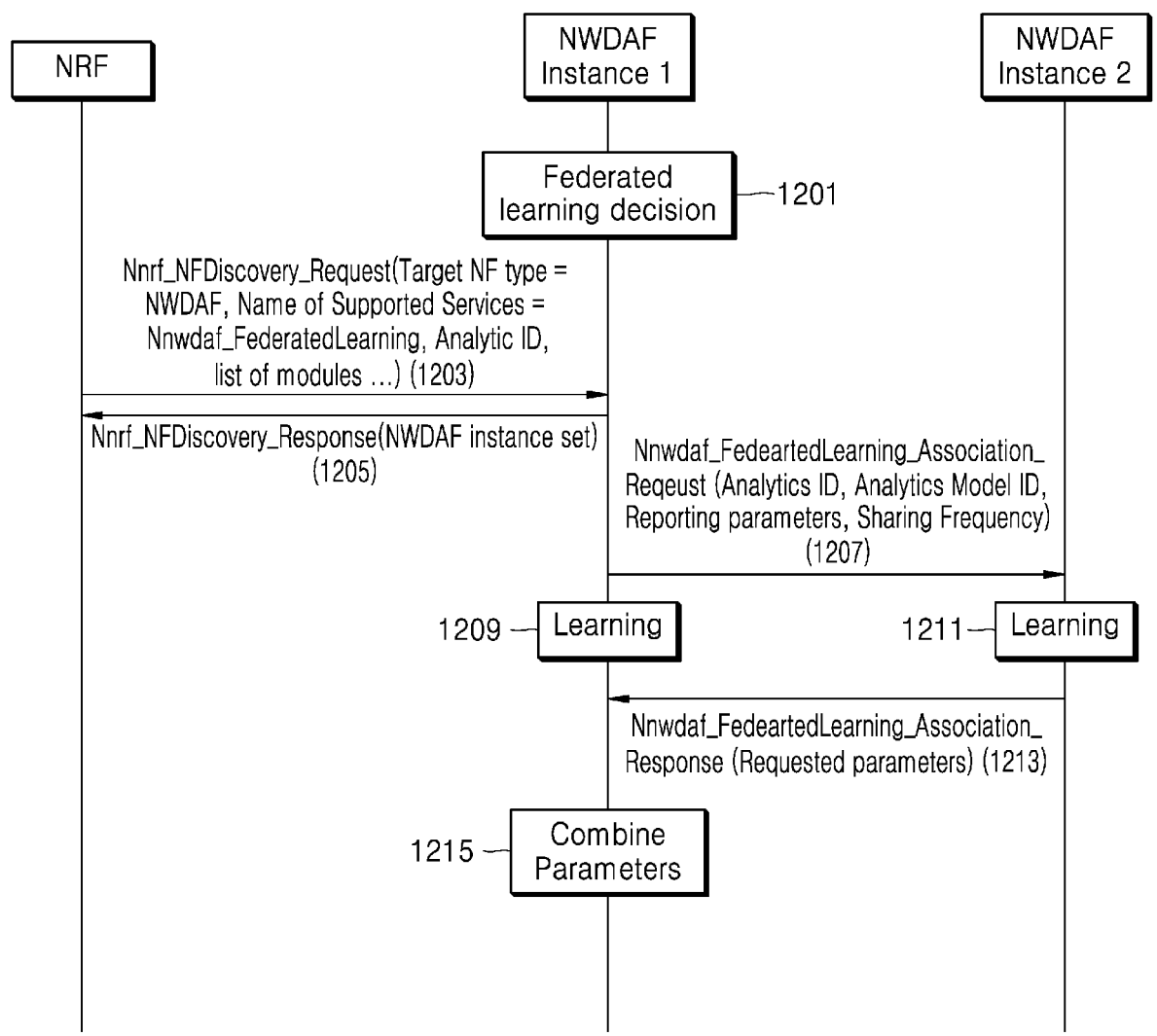
FIG. 12 is a sequence diagram illustrating a method of discovering and selecting an NWDAF instance for federated learning, according to an embodiment of the disclosure.

FIG. 12 is a sequence diagram illustrating a method of discovering and selecting an NWDAF instance for federated learning, according to an embodiment of the disclosure.

Referring to FIG. 12, in operation 1201, NWDAF instance 1 may determine to perform federated learning.

In operation 1203, NWDAF instance 1 to perform federated learning may transmit a request of Nnrf_NFDiscovery to an NRF to discover another NWDAF instance to share a learning factor with. Here, the request of Nnrf_NFDiscovery may include whether or not a target NWDAF instance to share the learning factor with supports a service of Nnwdaf_FederatedLearning_Association.

In operation 1205, the NRF may return instances of the NWDAF supporting the service of Nnwdaf_FederatedLearning_Association. For example, the NRF may transmit, to NWDAF instance 1, a response message including information about a set of NWDAF instances supporting the service of Nnwdaf_FederatedLearning_Association.

In operation 1207, by using Nnwdaf_FederatedLearning_Association_Request, NWDAF instance 1 may request NWDAF instance 2 newly discovered to share a learning factor with respect to a predetermined model. Factors transmitted with the request may include an ID of analytics information with respect to which federated learning is to be performed, an analytics model ID, a list of factors to share, reporting period filter information, etc. According to an embodiment, the analytics information ID and the analytics model ID may be selectively included in the request of sharing the learning factor with respect to a predetermined model described above. Here, when the model is one used in NWDAF instance 1, NWDAF instance 1 may directly transfer the analytics model to NWDAF instance 2 so that NWDAF instance 2 may perform calculation.

In operations 1209 and 1211, NWDAF instance 1 and NWDAF instance 2 may perform learning, respectively.

In operation 1213, NWDAF instance 2 may report a learnt factor to NWDAF instance 1 at a period negotiated in operation 1207.

In operation 1215, NWDAF instance 1 may coordinate factors received from NWDAF instance 2 and its own factors to calculate an integrated factor and apply the calculated integrated factor to a model.

A sixth embodiment of the disclosure may include a method of registering and discovering an NWDAF instance for transferring an analytics model.

Figure 13:
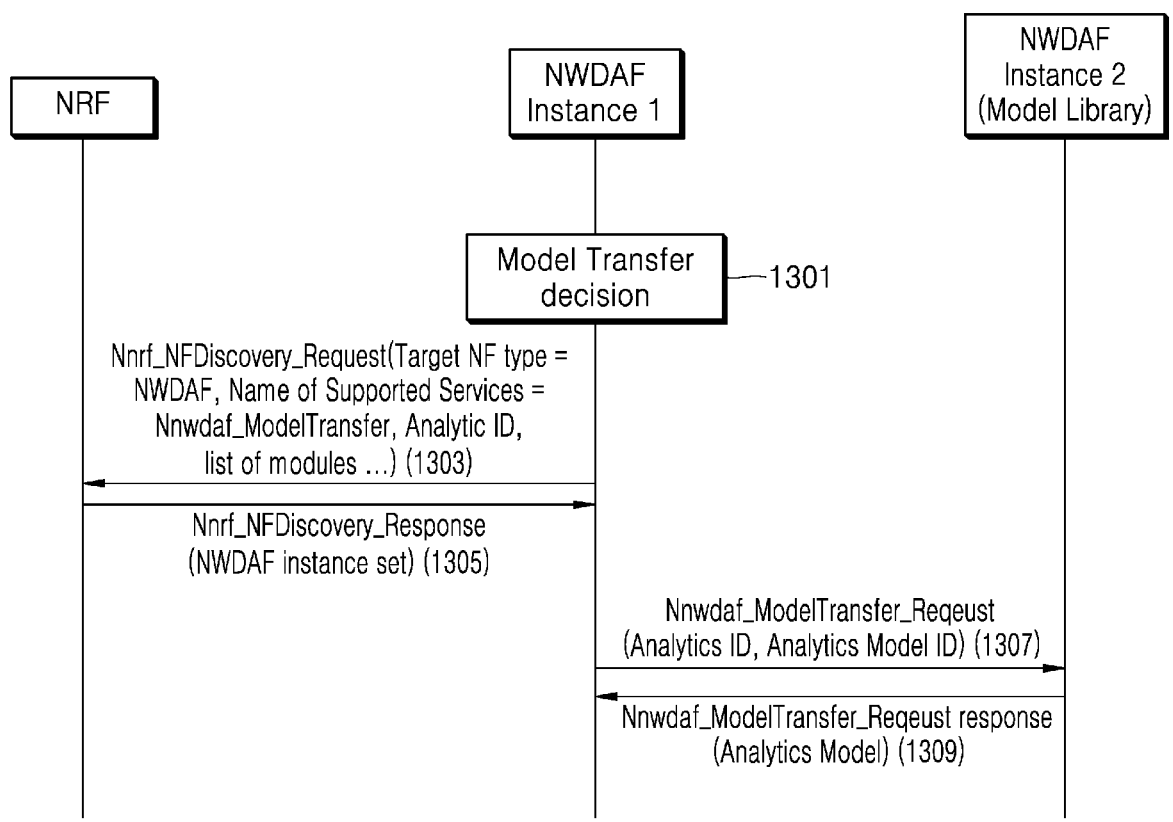
FIG. 13 is a sequence diagram illustrating a method of discovering and selecting an NWDAF instance for transferring an analytics model, according to an embodiment of the disclosure.

According to an embodiment, various methods, such as direct learning of an analytics model which may be driven an NWDAF, purchasing of a common use model, sharing a model with other instances, etc., may be used. Moreover, for providing the same analytics information, various models may be selectively used. Thus, when an NWDAF receives a request for analytics information, the NWDAF may select a model to calculate the analytics information and calculate the analytics information. Here, when there is not an analytics model that is required, the NWDAF may receive the analytics model from a model repository or another NWDAF instance. For the transferring of the analytics model, a service of Nnwdaf_Model_transfer may be defined in the disclosure. According to an embodiment, a procedure for performing the method of registering and discovering an NWDAF instance for the transferring of an analytics model described above is illustrated in FIG. 13.

According to an embodiment, before operation 1301 below is performed, operations 601 and 603 of FIG. 6 may be performed. For example, NWDAF instance 1 may perform provisioning with respect to NWDAF instance 1 and may be registered to an NRF.

In operation 1301, NWDAF instance 1 may recognize that a model for calculating the analytics information is required and may determine to receive the model for calculating the analytics information from another NWDAF instance.

In operation 1303, NWDAF instance 1 may transmit a request of Nnrf_NFDiscovery to an NRF to discover another NWDAF instance supporting the transferring of the model. Here, whether or not a target NWDAF instance supporting the transferring of the model supports a service of Nnwdaf_Model_transfer may be included in the request of Nnrf_NFDiscovery. Here, information about whether or not to discover a dedicated NWDAF instance for distribution of a model, such as a model repository may be additionally transmitted.

In operation 1305, the NRF receiving the request may return NWDAF instances supporting the service of Nnwdaf_Model_Transfer. For example, the NRF may transmit, to NWDAF instance 1, a response message including information about a set of NWDAF instances supporting the service of Nnwdaf_Model_Transfer.

In operation 1307, NWDAF instance 1 may request NWDAF2 newly discovered to transmit a predetermined analytics model, by using Nnwdaf_Model_Transfer_Request. Factors transmitted with the request may include an analytics information ID, an analytics model, etc. According to an embodiment, the analytics information ID and the analytics model ID may be selectively included in the request for transmitting the predetermined analytics model described above.

In operation 1309, NWDAF instance 2 may transmit the requested model to NWDAF instance 1.

Figure 14:
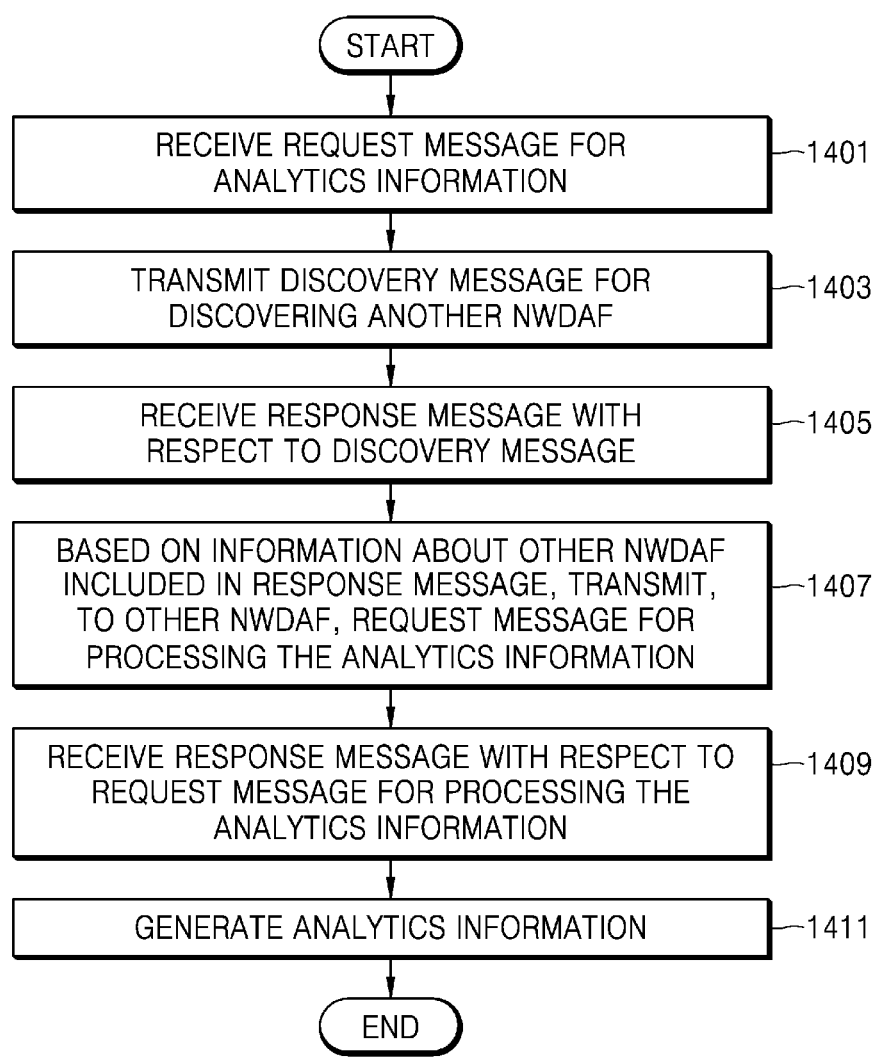
FIG. 14 is a flowchart of an operating method of a network entity, according to an embodiment of the disclosure.

FIG. 14 is a flowchart of an operating method of a network entity, according to an embodiment of the disclosure. According to an embodiment, a network entity performing the operating method as in FIG. 14 may denote an NWDAF (or an NWDAF instance). However, the disclosure is not limited thereto.

In operation 1401, an NWDAF may receive a request message with respect to analytics information. According to an embodiment, the NWDAF may receive the request message with respect to the analytics information from an NF, an AF, or OAM. As the request message with respect to the analytics information described above, Nnwdaf_AnalyticsSubscription_Subscribe or Nnwdaf_AnalyticsInfo_Request may be used.

Although not illustrated in FIG. 14, the NWDAF may determine to offload processing with respect to the requested analytics information to another NWDAF, based on the request message with respect to the analytics information described above. Alternatively, the NWDAF may determine to perform federated learning with another NWDAF. The NWDAF may determine to receive an analytics model from another NWDAF. Here, the analytics model may denote a model for calculating the requested analytics information.

In operation 1403, the NWDAF may transmit, to an NRF, a discovery message for discovering another NWDAF. According to an embodiment, the discovery message for discovering another NWDAF may include a type of the other NWDAF, names of supported services, an analytics information ID, information related to whether or not the other NWDAF supports offloading, information about a module included in the other NWDAF, or the like. For example, the module included in the other NWDAF may denote an interface or an inference engine module. The NWDAF may transmit a list of modules included in the other NWDAF to the NRF.

In operation 1405, the NWDAF may receive a response message with respect to the discovery message from the NRF. According to an embodiment, the response message with respect to the discovery message described above may include information about the other NWDAF. For example, the information about the other NWDAF may include information about a set of NWDAF instances to which the processing of the analytics information may be offloaded.

In operation 1407, based on the information about the other NWDAF included in the response message, the NWDAF may transmit a request message for processing the analytics information to the other NWDAF. For example, based on the request message for the analytics information received from the NF in operation 1401, the NWDAF may request the analytics information from the other NWDAF. According to an embodiment, a target, a time, and a degree of accuracy of the analytics information requested from the other NWDAF in operation 1407 may be the same as a target, a time, and a degree of accuracy of the analytics information requested by the NF from the NWDAF in operation 1401 or may include a smaller range than the same.

Alternatively, according to an embodiment, the NWDAF may transmit, to the other NWDAF, a message for requesting offloading of a task related to the processing of the analytics information. Here, the message for requesting offloading may include an analytics information ID, an ID of a model for processing the analytics information, a target for which the analytics information is used, information related to reporting of the analytics information, filter information related to selection of the analytics information, etc.

In operation 1409, the NWDAF may receive a response message with respect to the request message for processing the analytics information. According to an embodiment, the response message with respect to the request message for processing the analytics information may include a result of processing of analytics information performed by the other NWDAF, an indictor indicating whether or not offloading fails, information about a cause of a failure, or the like.

In operation 1411, the NWDAF may generate the analytics information. For example, the NWDAF may generate the analytics information based on a result of processing of the analytics information performed by the NWDAF and a result of processing of the analytics information performed by the other NWDAF. Here, the result of the processing of the analytics information performed by the other NWDAF may be included in the response message in operation 1409. Although not illustrated in FIG. 14, the NWDAF may transmit the generated analytics information to the NF, the AF, or the OAM having requested the analytics information.

According to an embodiment, the NWDAF may transmit, to the NRF, a discovery message for discovering another NWDAF performing federated learning. Also, the NWDAF may receive a response message with respect to the discovery message described above from the NRF. Also, the NWDAF may transmit, to another NWDAF, a message for requesting sharing of a parameter used in federated learning.

According to an embodiment, the parameter used in federated learning described above may include an analytics information ID, an ID of a model for learning the analytics information, a list of shared parameters, a reporting period with respect to the federated learning, or the like.

When the NWDAF transmits the discovery message for discovering another NWDAF to perform federated learning to the NRF, the NWDAF may generate a sharing parameter, based on a result of learning with respect to a parameter used in federated learning performed by the NWDAF and a result of learning with respect to a parameter used in federated learning performed by the other NWDAF. Here, the result of learning with respect to the parameter used in federated learning performed by the other NWDAF may be included in a response message with respect to the message for requesting sharing of the parameter used in federated learning.

According to an embodiment, the NWDAF may transmit, to the NRF, a discovery message for discovering another NWDAF transmitting an analytics model. In this case, the NWDAF may transmit a message for requesting transferring of the analytics model to the other NWDAF. Here, the message for requesting transferring of the analytics model may include an analytics information ID, an analytics information model ID, or the like.

Figure 15:
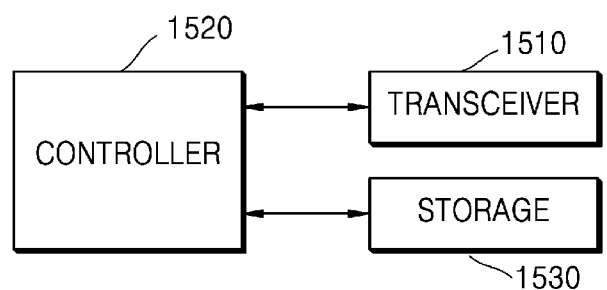
FIG. 15 is a block diagram of a structure of a network entity, according to an embodiment of the disclosure.

FIG. 15 is a block diagram of a structure of a network entity, according to an embodiment of the disclosure. The terms such as "unit", "module", and the like used in the disclosure indicate a unit, which processes at least one function or motion, and the unit and the module may be implemented by hardware or software, or by a combination of hardware and software. The structure of the network entity illustrated in FIG. 15 may indicate the structure of the network entities illustrated in FIG. 1. For example, the structure of the network entity illustrated in FIG. 15 may denote a structure of the NWDAF. However, it is not limited thereto, and the structure of the network entity illustrated in FIG. 15 may denote a structure of the AMF, the SMF, the PCF, etc.

Referring to FIG. 15, the network entity may include a transceiver 1510, a controller 1520, and a storage 1530. In the disclosure, the controller may be defined as a circuit, an application-specific integrated circuit, or at least one processor. According to an embodiment, the network entity described above may also be referred to as a core network entity.

The transceiver 1510 may exchange signals with other network entities. The transceiver 1510 may provide an interface for communicating with other devices in a network. That is, the transceiver 1510 may convert a bit string transmitted from the network entity to another device into a physical signal and may convert a physical signal received from the other device into a bit string. That is, the transceiver 1510 may transmit and receive a signal. Accordingly, the transceiver 1510 may be referred to as a modem, a transmitter, a receiver, a communication unit, or a communication module. Here, the transceiver 1510 may enable the network entity to perform communication with other devices or a system through a backhaul connection (for example, wired backhaul or wireless backhaul) or other connection methods.

The storage 1530 may store data for operations of the network entity, e.g., basic programs, application programs, and configuration information. The storage 1530 may be configured as a volatile memory, a non-volatile memory, or a combination of a volatile memory and a non-volatile memory. The storage 1530 may store at least one of information transmitted or received via the transceiver 1510 or information generated using the controller 1520. For example, the storage 1530 may store information required for discovering a service according to the embodiment described above.

The controller 1520 may control overall operations of the network entity according to an embodiment provided by the disclosure. For example, the controller 1520 may control a signal flow between blocks to perform an operation according to the procedures described above with reference to FIGS. 1 through 14. For example, the controller 1520 may control components of the network entity to select an NWDAF instance in a wireless communication system according to an embodiment of the disclosure.

According to an embodiment of the disclosure, an operating method of an NWDAF in a wireless communication system may include: receiving, from an NF, a request message for analytics information; based on the request message for the analytics information, transmitting, to an NRF, a discovery message for discovering at least another NWDAF; receiving, from the NRF, a response message with respect to the discovery message, wherein the response message with respect to the discovery message may include information about the at least another NWDAF; based on the information about the at least another NWDAF, transmitting, to the at least another NWDAF, a request message for processing the analytics information; receiving, from the at least another NWDAF, a response message with respect to a request message for processing the analytics information, wherein the response message with respect to the request message for processing the analytics information may include a result of processing, performed by the at least another NWDAF, of the analytics information; based on a result of processing, performed by the NWDAF, of the analytics information, and the result of processing, performed by the at least another NWDAF, of the analytics information, generating the analytics information requested by the NF; and transmitting, to the NF, the generated analytics information.

According to an embodiment, the request message for processing the analytics information may include at least one of an identifier of the analytics information, a target for which the analytics information is used, or filter information for classifying the analytics information.

According to an embodiment, the transmitting, to the NRF, the discovery message for discovering the at least another NWDAF, based on the request message for the analytics information, may include, based on the request message for the analytics information, transmitting, to the NRF, the discovery message for discovering the at least another NWDAF providing a model for processing the analytics information.

According to an embodiment, the receiving of the response message with respect to the discovery message may include receiving, from the NRF, the response message including the information about the at least another NWDAF providing the model for processing the analytics information.

According to an embodiment, the operating method of the NWDAF may further include: transmitting, to the at least another NWDAF providing the model for processing the analytics information, a message for requesting provision of the model for processing the analytics information; and receiving, from the at least another NWDAF providing the model for processing the analytics information, information about the model for processing the analytics information, wherein the message for requesting provision of the model for processing the analytics information may include an identifier of the analytics information and an identifier of the model for processing the analytics information.

According to an embodiment, the operating method of the NWDAF may further include: performing provisioning on the NWDAF; and transmitting, to the NRF, a message for registering the NWDAF.

According to an embodiment, the operating method of the NWDAF may further include: based on the request message for the analytics information received from the NF, determining to offload processing of the analytics information to the at least another NWDAF.

According to an embodiment, the discovery message for discovering the at least another NWDAF may include at least one of a type of the at least another NWDAF, a name of a supported service, an identifier of the analytics information, information about whether or not the at least another NWDAF supports offloading, or information about a module included in the at least another NWDAF.

According to an embodiment of the disclosure, an NWDAF in a wireless communication system may include: a transceiver; and at least one processor configured to: receive, from an NF, a request message for analytics information, through the transceiver; based on the request message for the analytics information, transmit, to an NRF, a discovery message for discovering at least another NWDAF, through the transceiver; receive, from the NRF, a response message with respect to the discovery message, through the transceiver, wherein the response message with respect to the discovery message may include information about the at least another NWDAF; based on the information about the at least another NWDAF, transmit, to the at least another NWDAF, a request message for processing the analytics information, through the transceiver; receive, from the at least another NWDAF, a response message with respect to a request message for processing the analytics information, through the transceiver, wherein the response message with respect to the request message for processing the analytics information may include a result of processing, performed by the at least another NWDAF, of the analytics information; based on a result of processing, performed by the NWDAF, of the analytics information, and the result of processing, performed by the at least another NWDAF, of the analytics information, generate the analytics information requested by the NF; and transmit, to the NF, the generated analytics information, through the transceiver.

According to an embodiment, the request message for processing the analytics information may include at least one of an identifier of the analytics information, a target for which the analytics information is used, or filter information for classifying the analytics information.

According to an embodiment, the at least one processor may further be configured to, through the transceiver, transmit, to the NRF, the discovery message for discovering the at least another NWDAF providing a model for processing the analytics information, based on the request message for the analytics information.

According to an embodiment, the at least one processor may further be configured to, through the transceiver, receive, from the NRF, the response message including the information about the at least another NWDAF providing the model for processing the analytics information.

According to an embodiment, the at least one processor may further be configured to: through the transceiver, transmit, to the at least another NWDAF providing the model for processing the analytics information, a message for requesting provision of the model for processing the analytics information; and through the transceiver, receive, from the at least another NWDAF providing the model for processing the analytics information, information about the model for processing the analytics information, wherein the message for requesting provision of the model for processing the analytics information may include an identifier of the analytics information and an identifier of the model for processing the analytics information.

According to an embodiment, the at least one processor may further be configured to: perform provisioning on the NWDAF; and transmit, to the NRF, a message for registering the NWDAF.

According to an embodiment, the at least one processor may further be configured to, based on the request message for the analytics information received from the NF, determine to offload processing of the analytics information to the at least another NWDAF, and the discovery message for discovering the at least another NWDAF may include at least one of a type of the at least another NWDAF, a name of a supported service, an identifier of the analytics information, information about whether or not the at least another NWDAF supports offloading, or information about a module included in the at least another NWDAF.

The disclosure relates to a communication technique and system in which a 5G communication system for supporting a higher data rate than a beyond 4G communication system is converted to an IoT technology. The disclosure may be applied to intelligent services (e.g., smart homes, smart buildings, smart cities, smart cars or connected cars, health care, digital education, retail business, and security and safety related services) based on 5G communication technology and IoT related technology. An embodiment of the disclosure includes a method of subdividing an NWDAF into specific functions and efficiently discovering and selecting the NWDAF. Accordingly, the calculation efficiency of analytics information and resources for the calculation may be efficiently managed. Also, by transferring a model used for calculating the analytics information or by supporting federated learning, costs for generating, managing, and retaining a model may be reduced. Accordingly, in respect of the use of analytics information, optimized analytics information having a high level of accuracy and satisfaction according to a situation may be transmitted at an appropriate time period.

The methods according to the embodiments described in the claims or specification of the disclosure may be implemented in the form of hardware, software, or a combination of hardware and software.

When the methods are implemented by software, a computer-readable recording medium or a computer program product storing one or more programs (software modules) may be provided. The one or more programs stored in the computer-readable recording medium or the computer program product may be configured to be executed via one or more processors in an electronic device. The one or more programs may include instructions for the electronic device to execute the methods according to the embodiments of the disclosure described in the claims and the specification.

The programs (software modules or software) may be stored in non-volatile memories including RAM, flash memory, etc., ROM, electrically erasable programmable ROM (EEPROM), a magnetic disc storage device, CD-ROM, DVDs other optical storage devices, or magnetic cassettes. Alternatively, the programs may be stored in a memory composed of part or all of the memories described above. Also, each of the memories included in the memory may be provided in a multiple number.

Also, the programs may be stored in an attachable storage device, which may be accessed through a communication network, such as the Internet, the Intranet, a local area network (LAN), a wide LAN (WLAN), or a storage area network (SAN), or through a communication network combining the communication networks described above. The storage device may be connected via an external port to an apparatus performing the embodiments of the disclosure. Also, a separate storage device on a communication network may be connected to an apparatus performing an embodiment of the disclosure.

In the disclosure, the term 'computer program product' or 'computer-readable medium' is used to entirely refer to a medium such as a memory, a hard disk installed in a hard disk drive, or a signal. The "computer program product" or "computer-readable medium" are means provided to a method of selecting an NWDAF instance according to the disclosure.

In the above particular embodiments of the disclosure, the components included in the disclosure are expressed in the singular or plural according to the presented particular embodiments of the disclosure. However, the singular term or the plural term may be appropriately selected according to situations that are provided, for convenience of explanation. The disclosure is not limited to the singular components or the plural components. A component referred to by the plural term may be configured as a single component, and a component referred to by the singular term may be configured as a plurality of component.

Although specific embodiments have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof.

The invention claimed is:

1. A method of a network data analytics function (NWDAF) in a wireless communication system, the method comprising:
    receiving, from a network function (NF), a request message for analytics information;
    identifying that federated learning (FL) is required;
    transmitting, to a network repository function (NRF), a discovery message for discovering at least another NWDAF for FL that supports service related FL, wherein the discovery message comprises information about FL capability;
    receiving, from the NRF, a response message with respect to the discovery message, wherein the response message with respect to the discovery message comprises information about the at least another NWDAF for FL;
    selecting a target NWDAF for FL;
    transmitting, to the target NWDAF for FL, a request message comprising analytics identifier (ID), machine learning (ML) model ID, and a ML model;
    receiving, from the target NWDAF for FL, information about the ML model which is trained by the target NWDAF for FL; and
    obtaining an integrated model based on the information about the model which is trained by the target NWDAF for FL.

2. The method of claim 1, wherein the discovery message further comprises an analytics identifier (ID) and a target NF type information corresponding to NWDAF.

3. A network data analytics function (NWDAF) in a wireless communication system, the NWDAF comprising:
    a transceiver within programmable data processing equipment; and
    at least one processor within the programmable data processing equipment, the at least one processor configured to:
        receive, from a network function (NF), a request message for analytics information, through the transceiver;
        identify that federated learning, FL, is required;
        transmit, through the transceiver to a network repository function (NRF), a discovery message for discovering at least another NWDAF for FL that supports service related FL, wherein the discovery message comprises information about FL capability;
        receive, from the NRF, a response message with respect to the discovery message, through the transceiver, wherein the response message with respect to the discovery message comprises information about the at least another NWDAF for FL;
        based on the information about the at least another NWDAF, transmit, to the at least another NWDAF, a request message for processing the analytics information, through the transceiver;
        select a target NWDAF for FL;
        transmit, through the transceiver to the target NWDAF for FL, a request message comprising an analytics identifier (ID), a machine learning (ML) model ID, and a ML model;
        receive, through the transceiver from the target NWDAF for FL, information about the ML model which is trained by the target NWDAF for FL; and
        obtain an integrated model based on the information about the model which is trained by the target NWDAF for FL.

4. The NWDAF of claim 3, wherein the discovery message further comprises an analytics identifier (ID) and a target NF type information corresponding to NWDAF.

* * * * *